United States Patent
Ashizaki et al.

(10) Patent No.: US 8,181,873 B2
(45) Date of Patent: May 22, 2012

(54) INFORMATION READING APPARATUS AND INFORMATION READING METHOD

(75) Inventors: Koji Ashizaki, Tokyo (JP); Takahiro Toyoda, Tokyo (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 12/211,312

(22) Filed: Sep. 16, 2008

(65) Prior Publication Data

US 2009/0084846 A1    Apr. 2, 2009

(30) Foreign Application Priority Data

Sep. 27, 2007  (JP) ................................ 2007-251247

(51) Int. Cl.
    *G06K 7/08*    (2006.01)

(52) U.S. Cl. .... 235/449; 235/451; 340/10.1; 340/572.1; 340/572.4

(58) Field of Classification Search ................ 235/449, 235/451, 43.5; 340/10.1, 572.4, 572.1; 343/742, 343/867, 725, 728, 872, 879, 893
See application file for complete search history.

(56) References Cited

U.S. PATENT DOCUMENTS

| | | | | | |
|---|---|---|---|---|---|
| 6,082,621 | A | * | 7/2000 | Chan et al. | 235/462.28 |
| 6,127,928 | A | * | 10/2000 | Issacman et al. | 340/572.1 |
| 2004/0125053 | A1 | * | 7/2004 | Fujisawa | 345/76 |
| 2007/0013601 | A1 | * | 1/2007 | Atkinson et al. | 343/873 |
| 2007/0183271 | A1 | * | 8/2007 | Ashizaki et al. | 369/14 |

FOREIGN PATENT DOCUMENTS

| | | |
|---|---|---|
| JP | 9-245381 | 9/1997 |
| JP | 2001-247209 | 9/2001 |
| JP | 2005-339170 | 12/2005 |

* cited by examiner

*Primary Examiner* — Michael G Lee
*Assistant Examiner* — Tabitha Chedekel
(74) *Attorney, Agent, or Firm* — Oblon, Spivak, McClelland, Maier & Neustadt, L.L.P.

(57) ABSTRACT

A portable information reading apparatus includes: a first antenna which has a loop or spiral like shape and is provided in a plate-like manner on one surface of an outer shape; a second antenna which is provided in a plate-like manner on a side face of the one surface, has a loop or spiral like shape, and has a smaller size in a short axis than that in a short axis of the first antenna; and a control part adapted to communicate with a non-contact type IC chip by using the first or second antenna and obtain the information recorded on the IC chip, in which when the information is obtained from the IC chip via the second antenna, the control part determines whether the information obtained via the second antenna is a search condition for searching for the information recorded on the IC chip.

19 Claims, 31 Drawing Sheets

COMMUNICATION STATE WHEN FIRST ANTENNA IS USED

COMMUNICATION STATE WHEN SECOND ANTENNA IS USED

| DISK MAIN INFORMATION | | |
|---|---|---|
| ELEMENT NUMBER | INFORMATION TYPE | CONTENT |
| A1 | DISK ID | 6C34D5B7A9E8F202 |
| A2 | CHIP ID | 9E8F2D64AC35B702 |
| A3 | TV PROGRAM | NIGHT DRAMA |
| A4 | TV PROGRAM | NIGHT DRAMA |
| A5 | MUSIC SONG | IT WILL BE FINE TOMORROW |

422

| DISK AUXILIARY INFORMATION | | | |
|---|---|---|---|
| ELEMENT NUMBER | MAIN INFORMATION NUMBER | INFORMATION TYPE | CONTENT |
| B1 | A3 | PROGRAM RECORDING TIME | 08/15/2007 20:00–21:54 |
| B2 | A3 | PROGRAM SECONDARY TITLE | LOVE ENCOUNTER – SECOND EPISODE |
| B3 | A3 | PROGRAM PERFORMER | NISHIKAWA RIKU, HIGASHIYAMA YONA |
| B4 | A4 | PROGRAM RECORDING TIME | 08/22/2007 20:00–21:54 |
| B5 | A4 | PROGRAM SECONDARY TITLE | LOVE ENCOUNTER – THIRD EPISODE |
| B6 | A4 | PROGRAM PERFORMER | NISHIKAWA RIKU, HIGASHIYAMA YONA |
| B7 | A5 | MUSIC PERFORMANCE TIME | 00h05m15s |
| B8 | A5 | MUSIC SINGER | SHIMOUMI NAOMI |
| B9 | A5 | MUSIC SONGWRITER COMPOSER | SHIMOUMI NAOMI, SORAGAMI KENICHI |

FIG. 18

| DISK AUXILIARY INFORMATION | | | |
|---|---|---|---|
| ELEMENT NUMBER | MAIN INFORMATION NUMBER | INFORMATION TYPE | CONTENT |
| B1 | A3 | PROGRAM RECORDING TIME | 08/01/2007 18:00-20:59 |
| B2 | A3 | PROGRAM TYPE | SPORT |
| B3 | A3 | PROGRAM PERFORMER | KITANO JIRO (COMMENTARY) |
| B4 | A4 | PROGRAM RECORDING TIME | 08/02/2007 18:00-20:59 |
| B5 | A4 | PROGRAM TYPE | SPORT |
| B6 | A5 | PROGRAM PERFORMER | OKANAKA TARO (COMMENTARY) |
| B7 | A5 | PROGRAM RECORDING TIME | 08/03/2007 18:00-20:59 |
| B8 | A5 | PROGRAM TYPE | SPORT |
| B9 | A5 | PROGRAM PERFORMER | OKANAKA TARO (COMMENTARY) |

423

| DISK MAIN INFORMATION | | |
|---|---|---|
| ELEMENT NUMBER | INFORMATION TYPE | CONTENT |
| A1 | DISK ID | 6C34D5B7A9E8F203 |
| A2 | CHIP ID | 9E8F2D64AC35B703 |
| A3 | TV PROGRAM | BASEBALL LIVE TELECAST |
| A4 | TV PROGRAM | BASEBALL LIVE TELECAST |
| A5 | TV PROGRAM | BASEBALL LIVE TELECAST |

DETECTION INFORMATION

| CHIP ID | NOT FOUND |
| --- | --- |
| SEARCH RESULT | NOT FOUND |
| COINCIDENCE RATE | 0% |

SEARCH KEYWORD

| KEYWORD | KITANO ICHIRO |
| --- | --- |

○ TITLE  ○ TV/VIDEO  ○ ID
◉ PERSON  ○ MUSIC  ○ ALL

/ SEARCH HISTORY \ / DETECTION HISTORY \

| PERSON | SHIMOUMI NAOMI |
| --- | --- |
| ALL | LOVE |
| TITLE | SUNDAY FILM THEATER |

DETECTION INFORMATION

| CHIP ID | 9E8F2D64AC35B702 |
|---|---|

SEARCH RESULT

NOT FOUND

| COINCIDENCE RATE | 0% |
|---|---|

SEARCH KEYWORD

| KEYWORD | KITANO ICHIRO |
|---|---|

○ TITLE    ○ TV/VIDEO    ○ ID
● PERSON   ○ MUSIC       ○ ALL

SEARCH HISTORY / DETECTION HISTORY

| PERSON | SHIMOUMI NAOMI |
|---|---|
| ALL | LOVE |
| TITLE | SUNDAY FILM THEATER |

FIG. 22

DETECTION INFORMATION

| CHIP ID | 9E8F2D64AC35B701 |
|---|---|

SEARCH RESULT:
THIS IS GOOD MORNING
08/08/2007 06:00-07:59
TALKED-ABOUT HEALTHY EXERCISE
KITANO ICHIRO, MINAMIDA AKEMI

COINCIDENCE RATE: 100%

SEARCH KEYWORD

KEYWORD: KITANO ICHIRO

○ TITLE    ○ TV/VIDEO    ○ ID
● PERSON   ○ MUSIC       ○ ALL

SEARCH HISTORY / DETECTION HISTORY

| PERSON | SHIMOUMI NAOMI |
|---|---|
| ALL | LOVE |
| TITLE | SUNDAY FILM THEATER |

DETECTION INFORMATION

CHIP ID | 9E8F2D64AC35B703

SEARCH RESULT | BASEBALL LIVE TELECAST
08/01/2007 18:00-20:59
KITANO JIRO (COMMENTARY)

COINCIDENCE RATE | 25%

SEARCH KEYWORD

KEYWORD | KITANO ICHIRO

○ TITLE    ○ TV/VIDEO   ○ ID
● PERSON   ○ MUSIC      ○ ALL

| SEARCH HISTORY | DETECTION HISTORY |

| PERSON | SHIMOUMI NAOMI |
| ALL | LOVE |
| TITLE | SUNDAY FILM THEATER |

DETECTION INFORMATION

| CHIP ID | 9E8F2D64AC35B704 |
|---|---|

SEARCH RESULT:
YESTERDAY'S DREAM
SEIZE THE DAY
FUTURE IS WAITING
SONGWRITER/COMPOSER:
SORAGAMI KENICHI

COINCIDENCE RATE: 100%

SEARCH KEYWORD

KEYWORD: SORAGAMI KENICHI

○ TITLE   ○ TV/VIDEO   ○ ID
○ PERSON  ○ MUSIC      ● ALL

SEARCH HISTORY / DETECTION HISTORY

| PERSON | SHIMOUMI NAOMI |
|---|---|
| ALL | LOVE |
| TITLE | SUNDAY FILM THEATER |

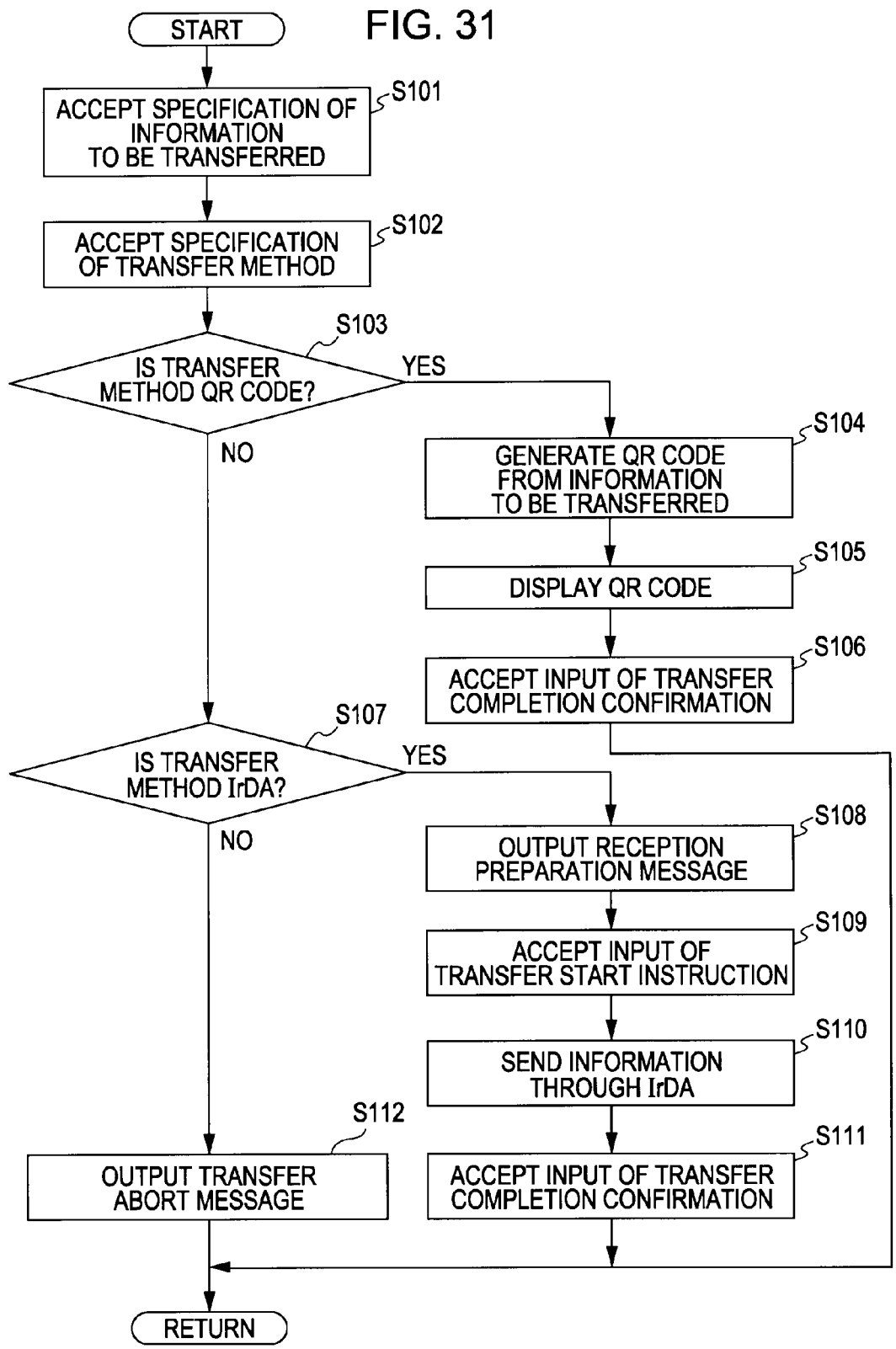

INFORMATION READING APPARATUS AND INFORMATION READING METHOD

CROSS REFERENCES TO RELATED APPLICATIONS

The present invention contains subject matter related to Japanese Patent Application JP 2007-251247 filed in the Japanese Patent Office on Sep. 27, 2007, the entire contents of which are incorporated herein by reference.

BACKGROUND OF THE INVENTION

1. Field of the Invention

The present invention relates to an information reading apparatus adapted to read information recorded on a non-contact type IC chip and an information reading method. In particular, the invention relates to a portable information reading apparatus adapted to read information recorded on a non-contact type IC chip and an information reading method.

2. Description of the Related Art

In recent years, as a recording medium on which a large amount of data such as video can be recorded, an optical disk like a CD (Compact Disc) or a DVD (Digital Versatile Disk) has been widely spread. Also, as the optical disk, not only a ROM (Read Only Memory) disk but also a recordable disk and a rewritable disk are also common.

This optical disk can record an extremely large amount of data at an inexpensive cost and accordingly is widely used for recording and distributing a program and data as well as for distributing music software and video software and recording audio data and video data such as broadcast audio and video.

On the other hand, a non-contact type IC (Integrated Circuit) chip which can exchange information in a non-contact manner with a reader/writer on a terminal side can shorten a processing time from a connection start to a connection end because a physical contact at the time of a communication with a terminal apparatus is not involved. Also the non-contact type IC chip has such a feature that a high security is achieved due to an advanced mutual authentication and cipher processing. For this reason, the non-contact type IC chip (the contactless IC chip or the contact RFID chip) is spread for use applications of electronic money, transport tickets, admission cards, and the like.

Then, mounting of the non-contact type IC chip having such superior features to a substrate of an optical disk is considered as before. For example, such an optical disk is considered that a recessed part is formed on each of two disk substrates, and an IC chip and an antenna for sending and receiving are arranged as an integrated module in a gap formed between the recessed parts when the disk substrates are bonded to each other (for example, refer to Japanese Unexamined Patent Application Publication No. 9-245381). With this configuration, it is possible to check a recording content of an optical disk without setting the optical disk in an optical disk player and accessing the optical disk.

Also, a technology for managing a large number of arranged goods by reading information recorded on tags attached to the goods is proposed. For example, an information inspection apparatus adapted to inspect an arrangement of goods by reading goods information recorded on information tags attached to the goods (for example, refer to Japanese Unexamined Patent Application Publication No. 2001-247209).

Incidentally, a communication is performed between the non-contact type IC chip and the reader/writer by using electromagnetic waves through antennas respectively provided to the non-contact type IC chip and the reader/writer. However, depending on shapes of the respective antennas, due to characteristics of the electromagnetic waves, directivity may be generated when the sending and receiving are performed in some cases. Accordingly depending on the intensities of the electromagnetic waves generated by the respective antennas and a positional relation between the antennas, such a situation may occur that the communication is difficult to perform.

In particular, in a non-contact type IC card of an electromagnetic induction system represented by the case of the communication frequency 13.56 MHz or RFID (Radio Frequency Identification), a communication state is set to be satisfactory when an antenna coil of the non-contact type IC chip and an antenna coil on the reader/writer side face each other. Thus, when directions of the respective antenna coils are orthogonal to each other (that is, normal lines of antenna faces of the antenna coils are orthogonal to each other), the communication may be difficult to perform in some cases.

In contrast to this, such a technology is proposed for improving a communication state by using a relay antenna called booster antenna in a case a satisfactory communication is difficult to perform due to the positional relation between the antennas. For example, such an information storage medium management system is considered for enabling, by providing a booster antenna to a storage case of a recording medium, a communication between a non-contact type IC chip mounted to the recording medium and a reader/writer provided to a storage rack (for example, refer to Japanese Unexamined Patent Application Publication No. 2005-339170).

SUMMARY OF THE INVENTION

Incidentally, the optical disks are often kept in dedicated storage cases in general, and a large number of optical disks put into the storage cases are placed on the storage rack in many cases. Therefore, as to the above-mentioned optical disks to which the non-contact type IC chips are mounted, such a situation is naturally considered that the optical disks are placed on the storage rack while similarly being put into the storage cases.

In contrast to this, according to the above-mentioned Japanese Unexamined Patent Application Publication No. 2001-247209, the optical disks stored in the storage case and arranged in parallel and a plurality of optical disks stored in the storage rack for each storage case are put in such a state that recording surfaces of the respective optical disks are mutually opposed to each other in proximity, and therefore it is difficult to set an antenna surface of the reader/writer closer to the recording surfaces in a parallel manner, and it is extremely difficult to communicate with the non-contact type IC chip.

For example, in a case where the surfaces in parallel with the recording surfaces of the optical disks in the storage cases (hereinafter, referred to as case principal surface) are arranged in proximity with each other, in order to put the antenna surface of the reader/writer and the antenna on the optical disk closer to the facing state for performing a satisfactory communication, such an operation is performed that an interval between adjacent storage cases is widened or the individual storage cases are pulled out. For this reason, when the communications are continuously performed with the plurality of non-contact type IC chips of the optical disks in the storage cases in sequence, it is necessary to perform the above-mentioned troublesome operation, which takes a certain period of time.

In view of the above, according to the above-mentioned Japanese Unexamined Patent Application Publication No. 2005-339170, as a method of communicating with the non-contact type IC chip of the optical disk in a state where the optical disk is stored in the storage case and placed on the storage rack, a booster is provided to the storage case in order that with use of a storage rack in which a reading coil for the non-contact type IC chip or an antenna board having the plurality of reading coils is arranged so as to be integrated with a division plate and a shelf plate, the non-contact type IC chip inside the case when the storage case is placed at the predetermined position. However, in this configuration, it is necessary to use the dedicated storage rack corresponding to the reading apparatus, and therefore the storage rack which the user already uses is difficult to cope with. In addition, it is difficult to use a portable general-use reading apparatus.

In this way, even in a state where the optical disk is stored in the storage case and placed on the storage rack, it is desirable to easily communicate with the non-contact type IC chip on the optical disk through an exposure of the reader/writer (or holding and passing the reader/writer over the case) from the case side face which is orthogonal to the case principal surface. In particular, as the storage case of the optical disk, particular structures represented by a jewel case (so-called CD Jewel Case) and a tall case (so-called DVD Amaray Case) are widely spread. Without significantly changing the structures of these storage cases, for example, regarding the optical disk on which the non-contact type IC chip is provided, it is desirable to easily communicate with the non-contact type IC chip in a state where the optical disks stored in the storage cases are arranged and also in a state where the stand-alone optical disks which are not stored in the storage cases are arranged.

The present invention has been made in view of the above-mentioned problems, and it is desirable to provide an information reading apparatus adapted to be able to easily communicate with a non-contact type IC chip of an optical disk and easily figure out a content of the non-contact type IC chip such as a recording content of the optical disk, and an information reading method.

In order to solve the above-mentioned problems, according to an embodiment of the present invention, there is provided a portable information reading apparatus adapted to read information recorded on a non-contact type IC chip, the information reading apparatus including: a first antenna which has a loop-like or spiral-like shape and is provided in a plate-like manner on one surface of an outer shape; a second antenna which is provided in a plate-like manner on a side face with respect to the one surface, has a loop-like or spiral-like shape, and has a size in a short axis of the second antenna which is smaller than a size in a short axis of the first antenna; and a control part adapted to communicate with the non-contact type IC chip by selectively using one of the first antenna and the second antenna and obtain the information recorded on the non-contact type IC chip, in which in a case where the information is obtained from the non-contact type IC chip via the second antenna, the control part determines whether or not the information obtained via the second antenna corresponds to a search condition used for searching for the information recorded on the non-contact type IC chip.

In such an information reading apparatus, the first antenna which has the loop-like or spiral-like shape is provided in the plate-like manner on one surface of the outer shape. Also, the second antenna which is provided in the plate-like manner on the side face with respect to the one surface, has the loop-like or spiral-like shape, and has the size in the short axis smaller than the size in the short axis of the first antenna. Then, the control part communicates with the non-contact type IC chip by selectively using one of the first antenna and the second antenna and obtains the information recorded on the non-contact type IC chip. Also, in a case where the information is obtained from the non-contact type IC chip via the second antenna, the control part determines whether or not the information obtained via the second antenna corresponds to the search condition used for searching for the information recorded on the non-contact type IC chip.

With the information reading apparatus according to the embodiment of the present invention, for example, for the optical disk case which stores the optical disk provided with the non-contact type IC chip and the antenna for the non-contact communication whose center is at the rotation center of the optical disk and which is provided with the booster antenna on the side face for supporting the communication with the non-contact type IC chip of the optical disk, in a state where the optical disk case is closed, by putting the second antenna of the information reading closer to the case side face where the booster antenna is provided, it is possible to perform the communication between the IC reader and the IC chip on the optical disk with certainty. Furthermore, in a case where the information is obtained from the non-contact type IC chip via the second antenna, it is possible to search the non-contact type IC chip for the information corresponding to the search condition.

As described above, regarding the optical disk to which the non-contact type IC chip is provided, it is possible to easily communicate with the non-contact type IC chip of the optical disk in a state where the optical disks stored in the storage cases are arranged and also in a state where the stand-alone optical disks which are not stored in the storage cases are arranged, and it is possible to easily find out the content of the non-contact type IC chip such as the recording content of the optical disk.

BRIEF DESCRIPTION OF THE DRAWINGS

FIG. 17 illustrates the disk main information and the disk auxiliary information recorded on the non-contact type IC chip (part 2);

FIG. 18 illustrates the disk main information and the disk auxiliary information recorded on the non-contact type IC chip (part 3);

FIG. 20 illustrates a search display screen displayed on an indicating display (part 1);

FIG. 21 illustrates the search display screen displayed on the indicating display (part 2);

FIG. 22 illustrates the search display screen displayed on the indicating display (part 3);

FIG. 23 illustrates the search display screen displayed on the indicating display (part 4);

FIG. 25 illustrates the search display screen displayed on the indicating display (part 6);

FIG. 31 is a flowchart for describing an information transfer processing executed by the IC reader according to the third embodiment.

DESCRIPTION OF THE PREFERRED EMBODIMENTS

Hereinafter, embodiments of the present invention will be described in detail with reference to the drawings.

First Embodiment

First, a basic configuration of an IC reader used according to a first embodiment of the present invention and a communication method between this IC reader and a non-contact type IC chip will be described.

Figure 1:
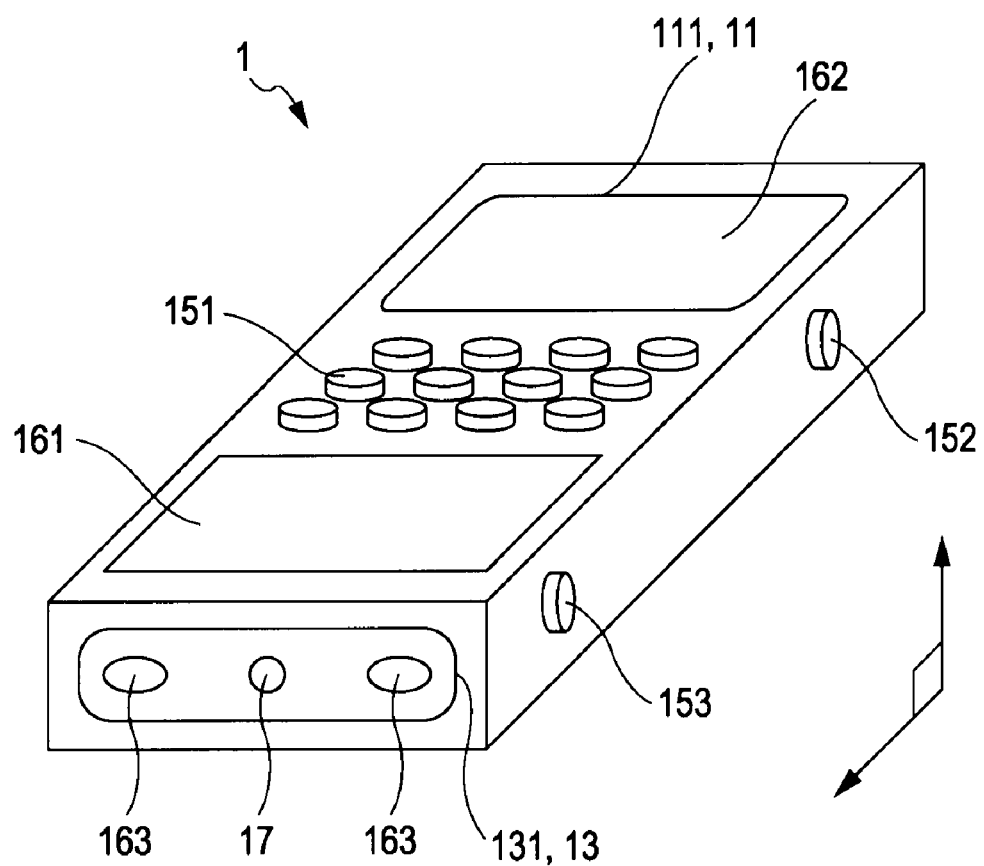
FIG. 1 is a perspective view of a configuration example of an IC reader.

FIG. 1 is a perspective view of a configuration example of the IC reader.

An IC reader 1 illustrated in FIG. 1 is configured by providing a reader function for a non-contact type IC to a remote controller for an optical disk reproduction and recording apparatus and arranging antenna coils on a top face and at an edge part. The IC reader 1 is mainly used in a state where a user grasps the IC reader by one hand. In order to read the information stored on the non-contact type IC chip provided to the optical disk, the IC reader has the following basic configuration. That is, in order to read the information recorded on the non-contact type IC chip, the IC reader 1 is provided with a first antenna part 11 and a second antenna part 13. Also, the IC reader 1 includes an external communication part 17, input buttons 151, a display button 152, a search button 153, an indication display 161, an antenna light emitting part 162, projector parts 163, and an audio output part 164 which will be described in FIG. 3.

The first antenna part 11 is provided with a loop-like or spiral-like first antenna coil 111 which is arranged on an upper surface of the IC reader 1 in a plate-like manner. A normal line on a loop surface of the first antenna coil 111 directs in a vertical direction in a state where the user grasps the IC reader 1 in general. With the first antenna coil 111, in a state where the optical disk having the non-contact type IC chip is put close from the above, by communicating with the non-contact type IC chip of the optical disk, for example, the recording content of the optical disk or the like can be obtained as the information recorded on the non-contact type IC chip is displayed.

The second antenna part 13 is provided with a loop-like or spiral-like second antenna coil 131 provided in a plate-like manner on a front face which corresponds to the front when the user generally grasps the IC reader 1 among the side faces of the IC reader 1. The second antenna coil 131 is arranged so that a normal line of an antenna surface thereof is orthogonal to a normal line direction of an antenna surface of the first antenna coil 111. In a state where the second antenna coil 131 is put closer to the booster antenna of the optical disk case which stores the optical disk, by communicating with the non-contact type IC chip of the optical disk via the booster antenna of the optical disk case, for example, the recording content of the optical disk can be obtained as a search for the information recorded on the non-contact type IC chip is performed.

Herein, the second antenna coil 131 is formed in such a manner that a size in a short axis thereof is set smaller than that in a short axis of the first antenna coil 111. Therefore, an external antenna coil which can be the communication target of the second antenna coil 131 is smaller than an external antenna coil which can be the communication target of the first antenna coil 111. To be more specific, as will be described below, a size and a shape of the first antenna coil 111 are optimized so as to establish an electromagnetic coupling with the antenna coil of the non-contact type IC chip mounted on the optical disk, and a size and a shape of the second antenna coil 131 are optimized so as to establish an electromagnetic coupling with the antenna coil provided along the side face of the optical disk case which stores the optical disk.

The external communication part 17 can communicate with an external electronic apparatus such as a mobile phone or an information communication terminal through an infrared communication such as IrDA (registered trademark), a wireless communication such as Bluetooth (registered trademark), or the like.

The input buttons 151 is a button for accepting an input of the information such as the search condition input by the user. The display button 152 is a button for obtaining the information recorded on the non-contact type IC chip by operating the first antenna part 11. The display button 152 is provided in the vicinity of the first antenna part 11. The search button 153 is a button for searching for the information recorded on the non-contact type IC chip by operating the second antenna part 13. The search button 153 is provided in the vicinity of the second antenna part 13.

The indication display 161 displays the information recorded on the non-contact type IC chip obtained through the first antenna part 11, the result which is searched for through the second antenna part 13, and the like. A liquid crystal monitor is used for the indication display 161, but another flat display device such as, for example, an organic EL (Electroluminescence) display may also be used. The antenna light emitting part 162 emits light when the communication with the non-contact type IC chip is performed through the first antenna part 11 or the second antenna part 13. The projector parts 163 emits the light to a further forward side of the second antenna part 13 in a case where the information obtained through the second antenna part 13 corresponds to the search condition. The audio output part 164 outputs an audio message indicating the state of the IC reader 1 such as the search result of the information recorded on the non-contact type IC chip.

Figure 2:
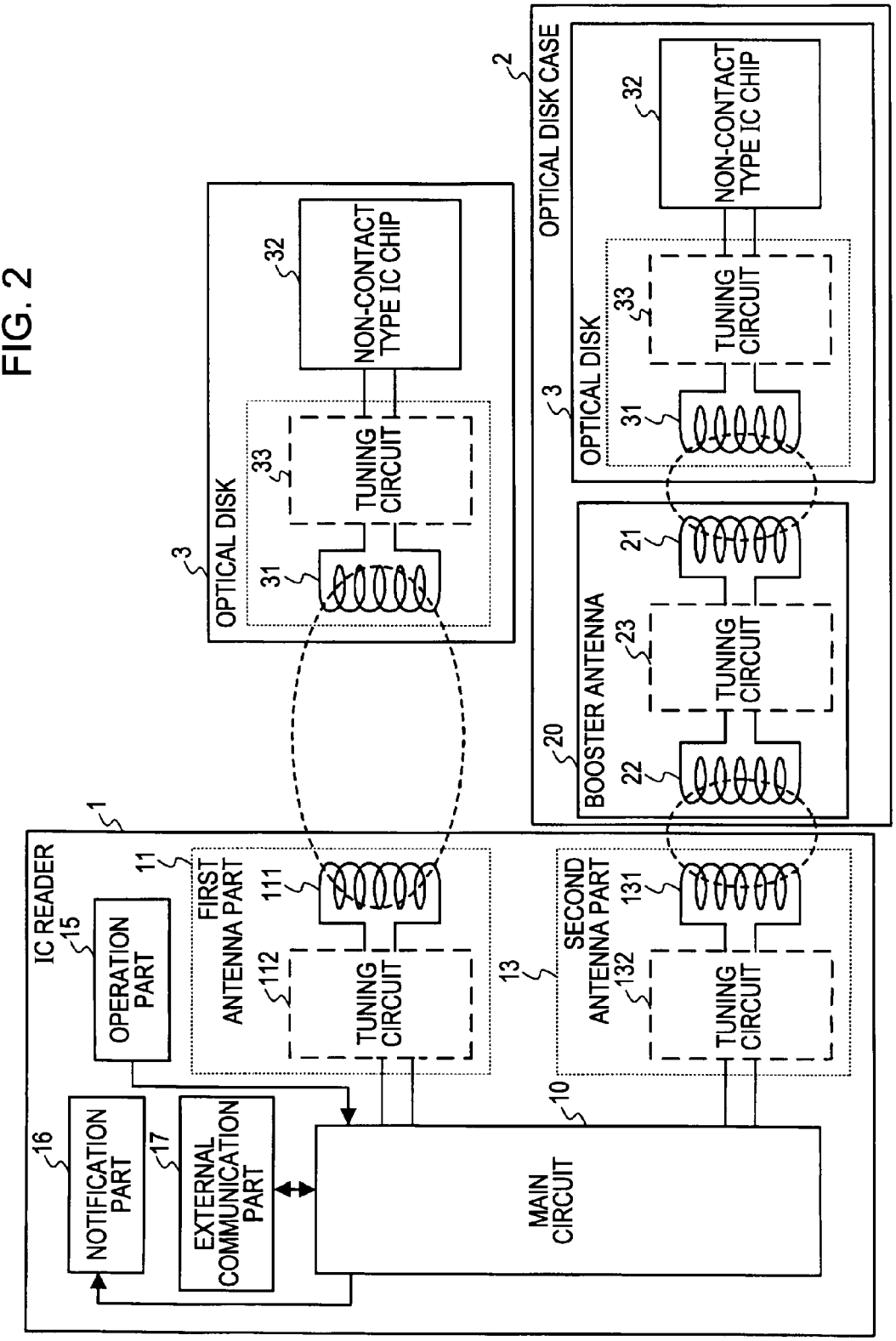
FIG. 2 is a schematic diagram of a circuit configuration used for a communication between the IC reader and a non-contact type IC chip mounted on an optical disk.

FIG. 2 is a schematic diagram of a circuit configuration used for the communication between the IC reader and the non-contact type IC chip mounted to the optical disk.

The IC reader 1 according to the present embodiment is provided with a main circuit 10, the first antenna part 11, the second antenna part 13, an operation part 15, a notification part 16, and the external communication part 17. The IC reader 1 can directly communicate with a non-contact type IC chip 32 on the optical disk 3 through the first antenna part 11 and can also communicate with the non-contact type IC chip on the optical disk 3 in the state of being stored in an optical disk case 2 through the second antenna part 13 via a booster antenna 20. It should be noted that the booster antenna 20 is provided inside the optical disk case 2 and is adapted to relay sending and receiving signals between the non-contact type IC chip 32 on the optical disk 3 stored therein and an external antenna such as the second antenna coil 131 of the IC reader 1.

The main circuit 10 of the IC reader 1 is composed, for example, of a control circuit for controlling the operation of the IC reader 1, a modem circuit for the electromagnetic waves for supplying the sending and receiving signals or power source with the non-contact type IC chip 32 mounted to the optical disk 3, and the like. The main circuit 10 is connected to the first antenna part 11 and the second antenna part 13 for obtaining the information recorded on the non-contact type IC chip 32 of the optical disk 3. The main circuit 10 selectively uses one of the first antenna part 11 and the second antenna part 13 to communicate with the non-contact type IC chip 32 mounted on the optical disk 3 and obtains the information recorded on the non-contact type IC chip 32.

The first antenna part 11 includes the non-contact type IC chip 32 of the optical disk 3 which is not stored in the optical disk case 2, the spiral-like first antenna coil 111 for sending and receiving the electromagnetic waves, and a tuning circuit 112. The second antenna part 13 includes the non-contact type IC chip 32 of the optical disk 3 in a state of being stored in the plurality of arranged optical cases, the spiral-like second antenna coil 131 for sending and receiving the electromagnetic waves, and a tuning circuit 132. The main circuit 10 is connected via the tuning circuit 112 to the first antenna coil 111, and also connected via the tuning circuit 132 to the second antenna coil 131.

The tuning circuits 112 and 132 are composed of, for example, circuit components such as a coil, a capacitor, and a resistance. Parameters for circuit components in the tuning circuit 112 are selected so that impedance match of the circuit including the first antenna coil 111 and the tuning circuit 112 is adjusted with respect to the communication frequency. Similarly, parameters for circuit components in the tuning circuit 132 are selected so that impedance match of the circuit including the second antenna coil 131 and the tuning circuit 132 is adjusted with respect to the communication frequency.

The operation part 15 accepts the operation input to the IC reader 1 performed by the user. The notification part 16 notifies the user of the state of the IC reader 1. The external communication part 17 performs a communication between the IC reader 1 and an external information apparatus. The operation part 15, the notification part 16, and the external communication part 17 will be described in detail later with reference to FIG. 3.

The non-contact type IC chip 32 mounted to the optical disk 3 is composed of a codec circuit for the signals sent and received with the IC reader 1, the control circuit, a non-volatile memory medium, and the like. Herein, as an example, the electromagnetic waves are used to perform the communication between the non-contact type IC chip 32 and the IC reader 1, the non-contact type IC chip 32 is not provided with a battery, and the non-contact type IC chip 32 obtains an operation electric power from the electromagnetic waves supplied from the IC reader 1 side through electromagnetic induction. Also, a spiral-like antenna coil 31 for sending and receiving the electromagnetic waves with the IC reader 1 side is connected via a tuning circuit 33 to the non-contact type IC chip 32. The function of the tuning circuit 33 adjusts an impedance match with respect to the communication frequency similarly to the tuning circuits 112 and 132 of the IC reader 1.

As described above the booster antenna 20 is composed of spiral-like antenna coils 21 and 22 respectively corresponding to the side of the non-contact type IC chip 32 and the side of the IC reader 1, and a tuning circuit 23 for connecting these antenna coils. A function of a tuning circuit 23 includes adjusting an impedance match with respect to the communication frequency similarly to the tuning circuits 112, 132, and 33.

It should be noted that the tuning circuit 23 is not particularly used especially in a case where the impedances of the respective antenna coils 21 and 22 are matched to the communication frequency, and in this case, the antenna coils 21 and 22 can be directly connected to each other. Also, the tuning circuits 112 and 132 of the IC reader 1 and the tuning circuit 33 of the non-contact type IC chip 32 may be similarly provided as occasion demands.

It should be noted that the antenna coils 21, 22, and 31 as well as the first antenna coil 111 and the second antenna coil 131 may use a one-turn loop-like antenna, for example, other than the spiral shape.

Figure 3:
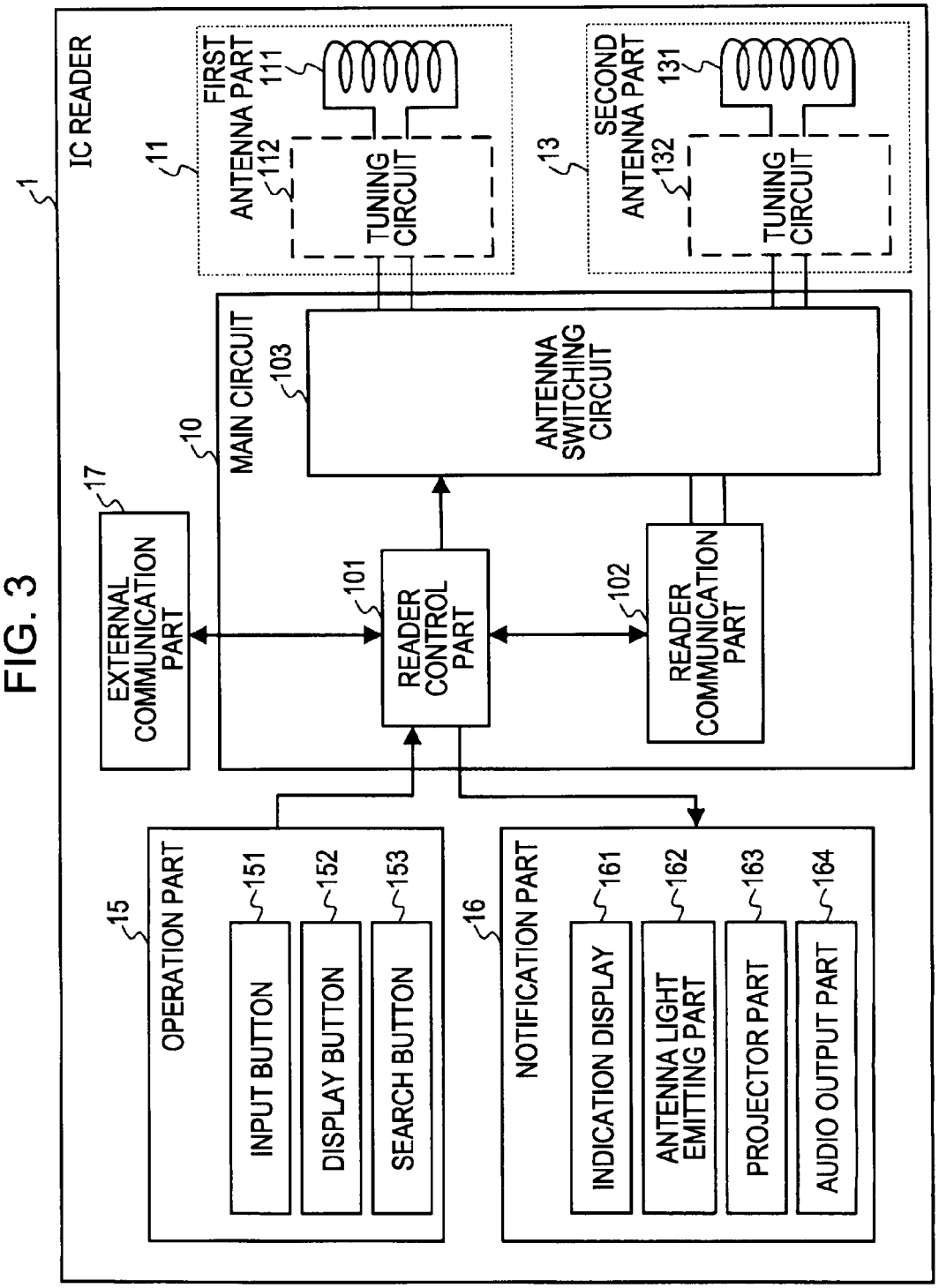
FIG. 3 illustrates a configuration of an IC reader according to a first embodiment of the present invention.

FIG. 3 illustrates a configuration of the circuit of the IC reader according to the first embodiment.

As described above, the IC reader 1 according to the present embodiment is provided with the main circuit 10, the first antenna part 11, the second antenna part 13, the operation part 15, the notification part 16, and the external communication part 17.

The main circuit 10 is provided with a reader control part 101, a reader communication part 102, and an antenna switching circuit 103.

The reader control part 101 is a control part adapted to control the entire IC reader 1 in an overall manner. The reader control part 101 is provided with a CPU (Central Processing Unit) (not shown) and memories such as a ROM (not shown)

and a RAM (Random Access Memory) (not shown). Then, by executing a program read from the memory, this CPU performs a control processing with respect to the respective parts of the IC reader 1.

The reader communication part 102 is an RF (Radio Frequency) circuit for performing a non-contact communication with the non-contact type IC chip 32 provided on the optical disk 3. The reader communication part 102 is provided with a modulation circuit (not shown) which modulates the sending data, a demodulation circuit (not shown) which demodulates the received data, and the like.

The antenna switching circuit 103 is connected to the first antenna part 11 and the second antenna part 13 for communicating with the non-contact type IC chip provided to the optical disk 32. The antenna switching circuit 103 selects, in accordance with a command from the reader control part 101, one of the first antenna part 11 provided with the first antenna coil 111 and the tuning circuit 112, and the second antenna part 13 provided with the second antenna coil 131 and the tuning circuit 132 to establish a continuity state.

The operation part 15 is provided with various input switches including the input buttons 151, the display button 152, and the search button 153, and is adapted to output the control signal in accordance with the operation input by the user to the reader control part 101. The input buttons 151 are buttons for accepting an input of information such as a search condition from the user. The display button 152 is a button for obtaining the information recorded on the non-contact type IC chip 32 by operating the first antenna part 11. The search button 153 is a button for searching for the information recorded on the non-contact type IC chip 32 by operating the second antenna part 13.

The notification part 16 is provided with the indication display 161, the antenna light emitting part 162, the projector parts 163, and the audio output part 164, and is adapted to notify the user of the state of the IC reader 1 in accordance with the instruction from the reader control part 101. The indication display 161 displays the information recorded on the non-contact type IC chip 32 obtained through the first antenna part 11, the result which is searched for through the second antenna part 13, and the like. The antenna light emitting part 162 emits light when the communication with the non-contact type IC chip 32 is performed through the first antenna part 11 or the second antenna part 13. The projector parts 163 emits the light from a position in the vicinity of the second antenna part 13 to the front, for example, in a case where the information obtained through the second antenna part 13 corresponds to the search condition. The audio output part 164 outputs an audio message indicating the state of the IC reader 1 such as the search result of the information recorded on the non-contact type IC chip 32.

The external communication part 17 sends and receives data by communicating with an external information apparatus while following an instruction from the reader control part 101. With the external communication part, it is possible to communicate with an external electronic apparatus through an infrared communication such as IrDA (registered trademark) or a wireless communication such as Bluetooth (registered trademark).

Figure 4:
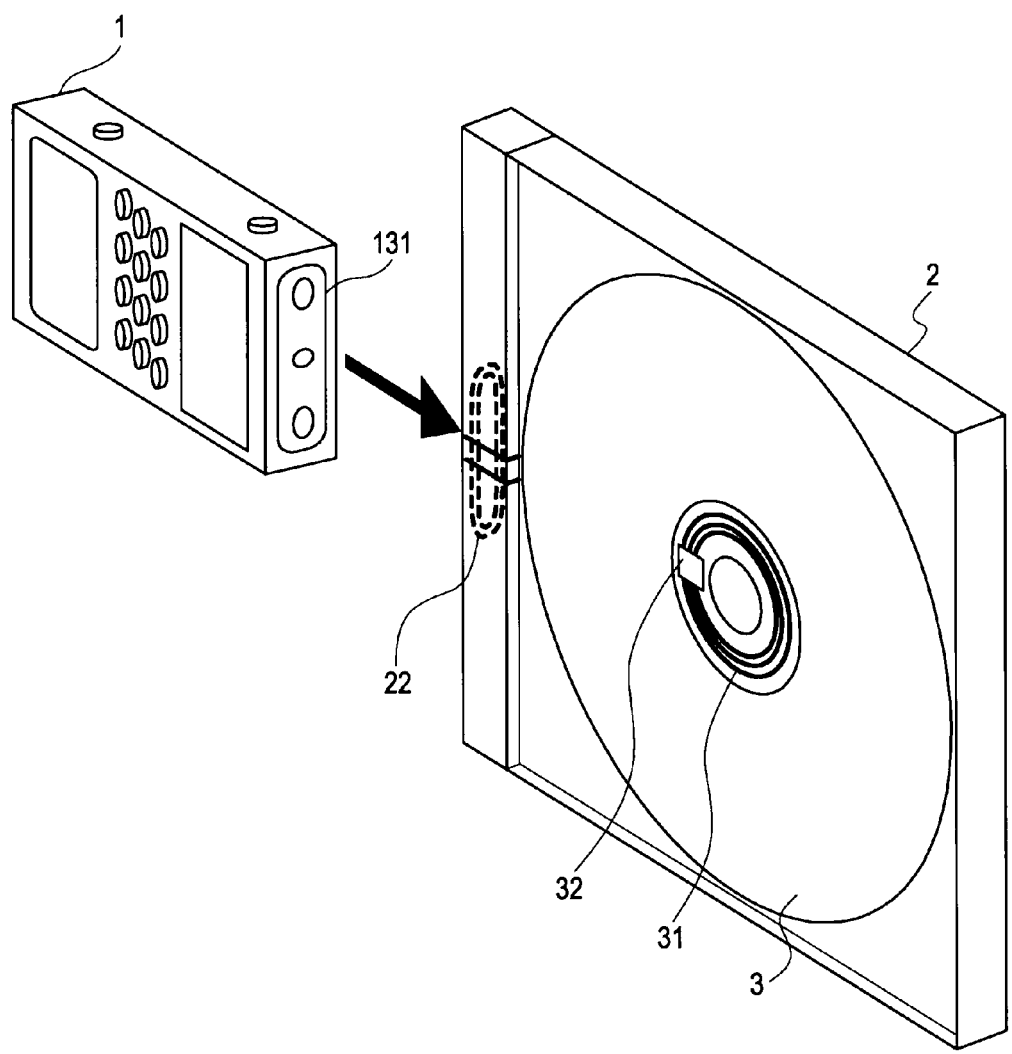
FIG. 4 illustrates a state in which the IC reader communicates with the non-contact type IC chip of the optical disk stored in an optical disk case.

FIG. 4 illustrates a state where the IC reader communicates with the non-contact type IC chip of the optical disk stored in the optical disk case.

In FIG. 4, the optical disk case 2 is a storage case made of resin to which the optical disk 3 is mounted inside thereof. An outer shape of the optical disk case 2 is rectangular parallelepiped in which a part in a direction perpendicular to the disk surface is made thinner. Also, on a side face connecting one side of a surface which is in parallel with the disk surface (the case principal surface), the antenna coil 22 constituting the booster antenna 20 (FIG. 2) for exchanging the signals with the IC reader 1 in proximity is provided. In the example of FIG. 4, the antenna coil 22 for communicating with the IC reader 1 is provided on the side face on a coupling part side for coupling a cover part to a base part of the optical disk case 2 so as to be rotatable. Also, the other antenna coil 21 constituting the booster antenna 20 is provided inside the optical disk case 2 so as to face the antenna coil 31 on the mounted optical disk 3 in proximity. It should be noted that detailed configurations of the optical disk case 2 and the booster antenna 20 will be described later.

As described above, the plate-like second antenna coil 131 is provided on the front surface of the IC reader 1. The IC reader 1 can communicate with the non-contact type IC chip 32 of the optical disk 3 via the booster antenna 20 of the optical disk case 2 by being faced with the second antenna coil 131 in proximity in a state where the long axis directions and the short axis directions are matched with respect to the antenna coil 22 on the IC reader side of the booster antenna 20 of the optical disk case 2 which stores the optical disk 3. With this configuration, it is possible to perform the search for the information recorded on the non-contact type IC chip 32 such as the recording content of the optical disk 3.

In particular, in a case where a large number of such optical disk cases 2 are stored on the storage rack, the adjacent optical disk cases 2 contact with each other (or are in proximity) on a surface in parallel to the disk surface (the case principal surface), and therefore it is difficult to communicate with the non-contact type IC chip 32 by exposing the IC reader 1 to the case principal surface. However, even in a state of being stored on the storage rack, at least one side face of the optical disk case 2 is exposed to the outside. Thus, when the antenna coil 22 of the booster antenna 20 is provided on this side face as illustrated in FIG. 4, it is possible to communicate with the non-contact type IC chip 32 by exposing the IC reader 1 to this side face.

Then, with the IC reader 1 according to the present embodiment, it is facilitated to search for the optical disk 3 which stores desired music or data in the following manner. That is, by communicating with the non-contact type IC chip 32 on the optical disk 3 in the state of being stored on the storage rack, for example, information such as music is recorded on the non-contact type IC, and this information is read by the IC reader 1 to be displayed on a display apparatus. Also, when the information matching to a specified keyword is recorded on the non-contact type IC chip 32, the user is notified by way of audio, light, or the like.

On the other hand, as the other first antenna coil 111 of the IC reader 1 faces and is put closer to the antenna coil 31 which is provided to the optical disk, the electromagnetic coupling with the antenna coil 31 can be established. Therefore, by causing the first antenna coil 111 of the IC reader 1 to face the disk surface to be put closer to the optical disk 3 taken out from the optical disk case 2 or the optical disk 3 stored in the optical disk case 2, it is possible to directly read the information from the non-contact type IC chip 32 on the optical disk 3.

It should be noted that according to the present embodiment, the example of the remote controller type IC reader 1 has been described, but the shape and the configuration of the IC reader 1 are merely an example. As another configuration of the IC reader, for example, the IC reader may be configured to be a dedicated use IC reader, or may also be incorporated into a mobile phone or another portable information communication terminal.

In addition, according to the present embodiment, the IC reader 1 only performs the read from the non-contact type IC chip, but the embodiment is not limited to this, and the IC reader 1 may perform the write to the non-contact type IC chip.

Also, the indication display 161 may be formed as so-called touch panel which outputs a control signal to the reader control part 101 by detecting a contact operation performed by the user on a display surface.

Figure 5:
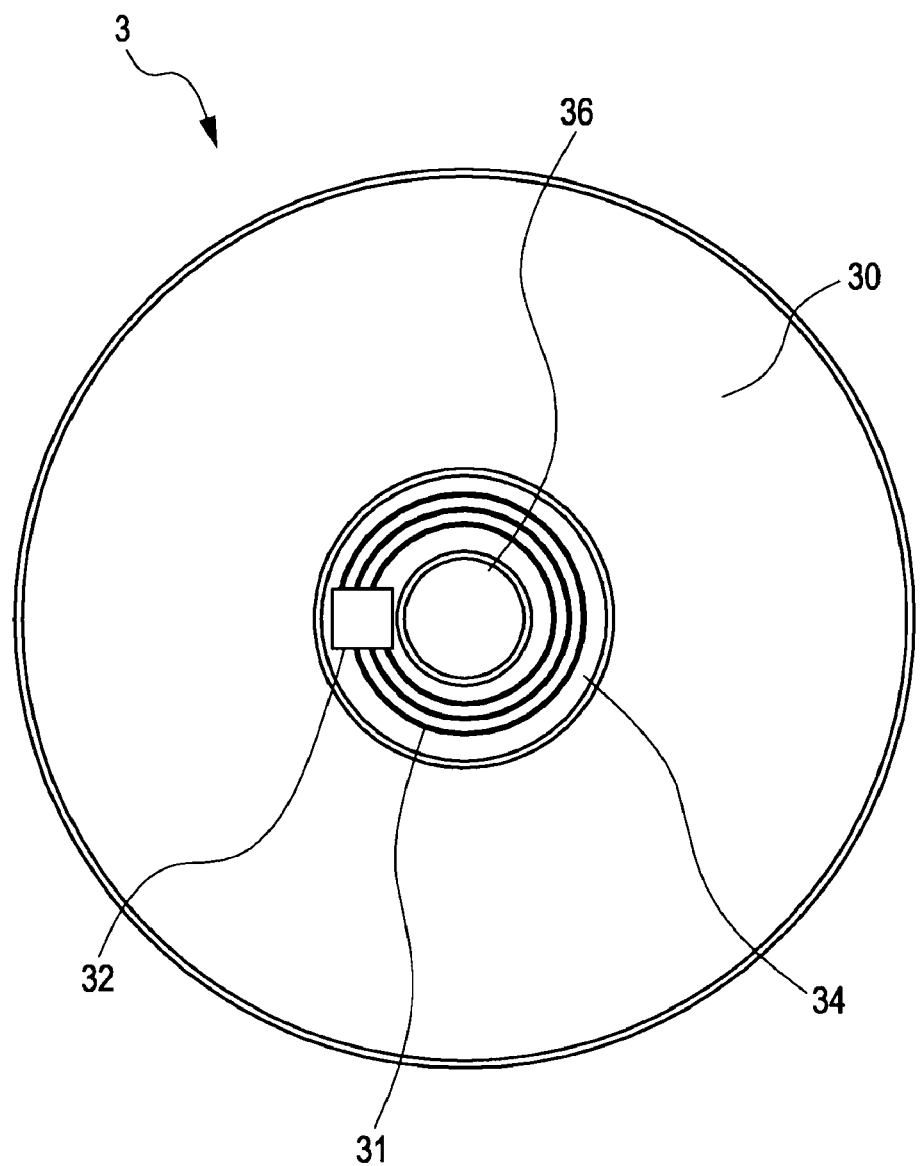
FIG. 5 is a plane view of a configuration example of the optical disk on which the non-contact type IC chip is mounted.

FIG. 5 is a plane view of a configuration example of the optical disk on which the non-contact type IC chip is mounted.

The optical disk 3 illustrated in FIG. 5 has the following configuration which is common to a general optical disk medium such as a CD, a DVD, HD-DVD (High Definition Digital Versatile Disk), or Blu-ray Disc (registered trademark of Sony Corporation). That is, the optical disk 3 is provided with a center hole 36 at a central part. When the optical disk 3 is inserted into a disk drive, the optical disk 3 is rotated about the center hole 36, and irradiated with laser light on a signal recording surface, so that a signal in accordance with the light amount of the reflected light is read.

An area outside by a predetermined distance from the center hole 36 of the optical disk 3 is composed as a signal recording area 30 where a reflection film made of a conducting material such as silver (Ag) or aluminum (Al) is formed. It should be noted that in a case of a writable optical disk, in addition to the reflection film, a recording film, a dielectric film, and the like are further formed on the signal recording area 30.

An area between the signal recording area 30 and the center hole 36 is for chucking the optical disk 3 within the disk drive. The area is called chucking area 34 or the like. Then, the antenna coil 31 for performing non-contact communications of the non-contact type IC chip 32 and the non-contact type IC chip 32 with the external IC reader is provided on the chucking area 34. In the example of FIG. 5, the antenna coil 31 has a three-turn spiral-like shape. The antenna coil 31 having such a shape is preferably used, for example, for a case of using a short wavelength band, which is represented by 13.56 MHz, as the communication frequency.

It should be noted that the antenna for the non-contact communication of the non-contact type IC chip 32 is preferably provided in a spiral manner (or a loop manner) about the rotation axis in a surrounding area of the center hole 36 so as to keep a weight balance when the optical disk 3 is rotated. Also, such an antenna is not limited to the chucking area 34 illustrated in FIG. 5, and may be provided, for example, on a back face of the area where the reflection film is formed or on the disk substrate at a disk edge which is further outer than the above-mentioned area. It should be noted that in a case where the antenna is arranged on the chucking area 34 and in the vicinity of the chucking area 34, such a merit is obtained that a working area with respect to the optical disk 3 can be made small. In addition, by arranging the antenna while avoiding the reflection film formation area, such merit are also obtained that signals can be recorded on both sides of the disk, an electromagnetic effect due to the reflection film can be suppressed, and the like.

Figure 6:
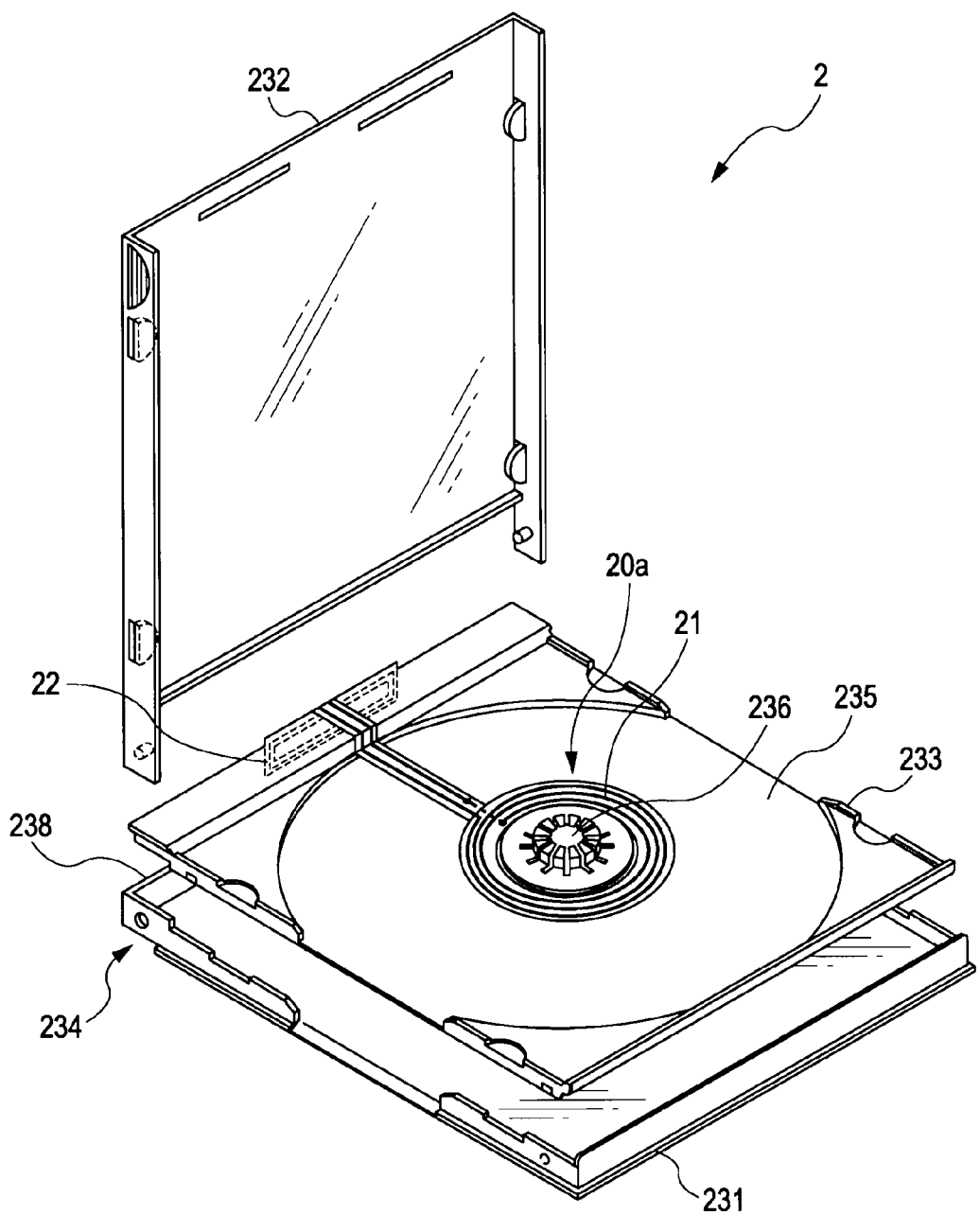
FIG. 6 is an exploded perspective view of a configuration example of an optical disk case on which a booster antenna is mounted.

FIG. 6 is an exploded perspective view of a configuration example of the optical disk case on which the booster antenna is mounted.

As illustrated in FIG. 6, the optical disk case 2 according to the present embodiment is basically composed of a base part 231 and a cover part 232 constituting an external casing, and a disk tray 233 stored in the base part 231 and the cover part 232. The base part 231 and the cover part 232 are coupled in a coupling part 234 so as to be rotatable. With respect to the base part 231, the cover part 232 is opened and closed about the coupling part 234. Also, in a state where the cover part 232 is closed, the cover part 232 is fitted to the base part 231 to form a box-like outer shape, and an inner part is sealed up.

The disk tray 233 is a member to which the optical disk 3 is attached, and is fitted to the inner side of the base part 231. In the disk tray 233, a circular concave disk placing surface 235 is formed on which the optical disk 3 is placed, and a convex disk holding part 236 is formed at the center part. A surrounding of the disk holding part 236 has elasticity. As the center hole 36 of the optical disk 3 is fitted to the disk holding part 236, the optical disk 3 is held.

The optical disk case 2 composed of the three members including the base part 231, the cover part 232, and the disk tray 233 is highly commonly distributed as a storage case mainly for a CD, and is called "jewel case" or the like. It should be noted that the base part 231, the cover part 232, and the disk tray 233 are formed, for example, a polystyrene resin material, and in general, at least the base part 231 and the cover part 232 are formed of a transparent resin material. Also, the base part 231 and the cover part 232, and the inner disk tray 233 may be manufactured by different manufacturers and separately distributed in some cases.

Figure 7:
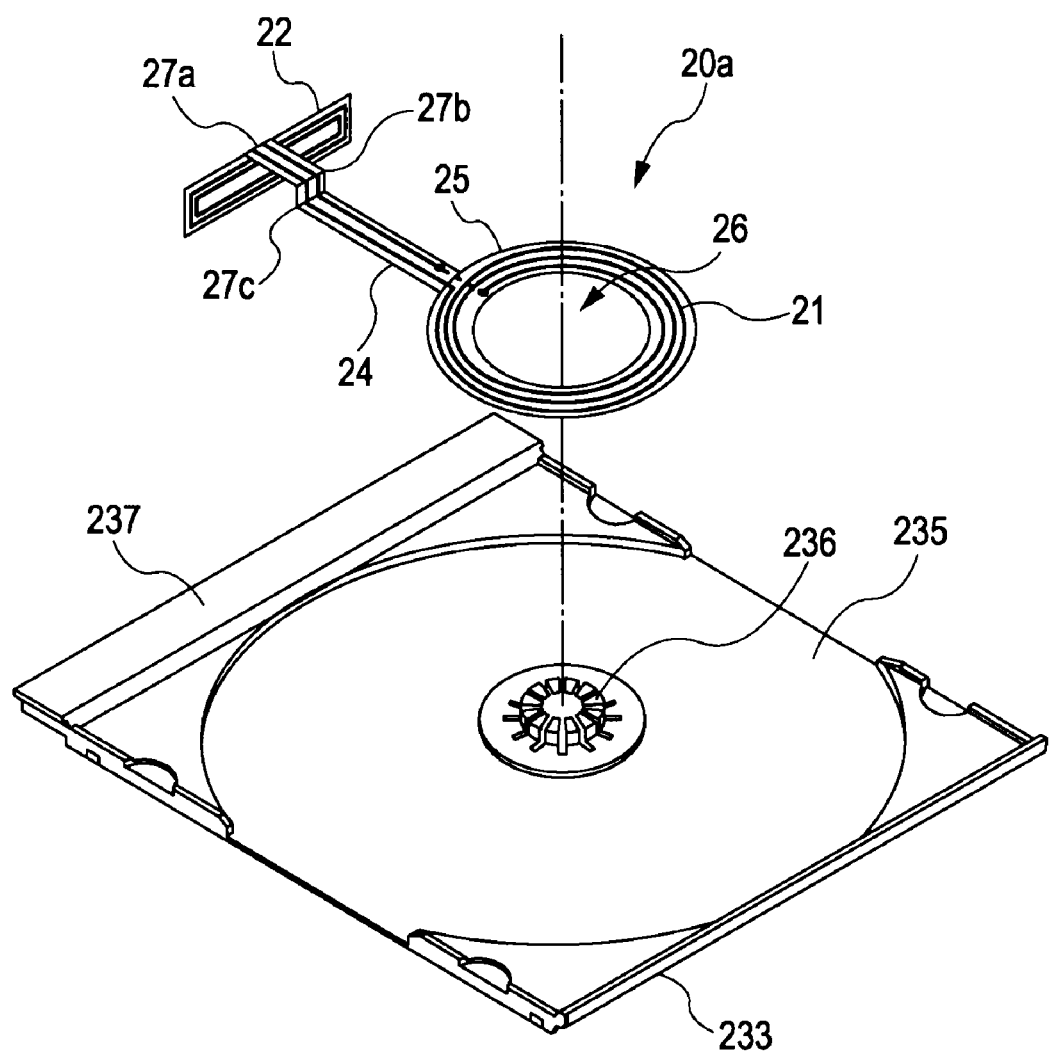
FIG. 7 is an exploded perspective view of a disk tray constituting the optical disk case and a booster antenna unit.

Then, according to the present embodiment, the booster antenna 20 for communicating with the non-contact type IC chip 32 on the optical disk 3 stored in the optical disk case 2 is provided on the disk tray 233. As illustrated in FIG. 7, according to the present embodiment, the booster antenna 20 is composed as a booster antenna unit 20a in which the antenna coils 21 and 22 are integrated with the substrate.

FIG. 7 is an exploded perspective view of the disk tray constituting the optical disk case and the booster antenna unit.

As illustrated in FIG. 7, the booster antenna unit 20a has such a configuration that the booster antenna 20 composed of the antenna coil 21 for the communication with the non-contact type IC chip 32, the antenna coil 22 for the communication with the IC reader 1, a connection wiring 24 for connecting the respective antenna coils 21 and 22 is formed on a flexible substrate 25. The respective antenna coils 21 and 22 and the connection wiring 24 are obtained, for example, by forming a metal material such as aluminum (Al) or copper (Cu) on the flexible substrate 25 through a printing or the like in a thin plate manner (or a thin film manner) or by performing an etching so that, for example, the connection wiring 24 is remained from a bonding material of a thin plate like metal material and the flexible substrate 25.

Also, in the central area of the antenna coil 21 on the non-contact type IC chip 32 side, a center hole 26 which allows the disk holding part 236 of the disk tray 233 to penetrate through the flexible substrate 25 is formed. Furthermore, in this example, in an area between the antenna coils 21 and 22 in the flexible substrate 25, folding parts 27a to 27c for matching with the surface shape of the disk tray 233 are formed.

It should be noted that the antenna diameter, the number of windings, and the like of the antenna coils 21 and 22 may be appropriately decided in accordance with the antenna diameter, the number of windings, and the like of the antenna coil 31 of the non-contact type IC chip 32 and the second antenna coil 131 of the second antenna part 13 in the IC reader 1 so that a satisfactory communication can be performed.

Also, the circuit configuration of the booster antenna 20 formed in the booster antenna unit 20a is as illustrated in FIG. 2. FIG. 7 illustrates an example of the booster antenna unit 20a in which the tuning circuit 23 is not formed. In a case where the tuning circuit 23 is used, in FIG. 7, for example, the tuning circuit 23 may be provided in the area where the connection wiring 24 in the flexible substrate 25. As described above, the tuning circuit 23 is composed, for example, of a coil, a capacitor, and a resistance. As a specific embodiment of the tuning circuit 23, for example, a pair of electrodes of a capacitor (a chip capacitor, not shown) is connected to a pair of wirings of the connection wiring 24, respectively, so that the capacitor can be connected to the antenna coils 21 and 22 in parallel. At this time, by adjusting a capacitance of the capacitor, it is possible to change the first impedance. As a result, it is possible to adjust the impedance match with respect to the communication frequency.

The optical disk case 2 according to the present embodiment is manufactured, for example, in the following procedure. First, as described above, the booster antenna unit 20a in which the antenna coils 21 and 22 and the connection wiring 24 are formed through the printing or the like is formed on the flexible substrate 25 in a flat state. On the other hand, the disk tray 233 is formed the through injection molding or the like.

Next, after the folding parts 27a to 27c of the booster antenna unit 20a are subjected to a folding process in a predetermined direction, the booster antenna unit 20a is fixed to the upper surface of the disk tray 233 (the surface on the disk placing surface 235 side) in a state where the center hole 26 is aligned with respect to the disk holding part 236 of the disk tray 233. In this example, among the flexible substrates 25, the opposite surfaces of the formation surfaces of the antenna coil 21 and the connection wiring 24 are fixed to the disk tray 233. As a result, the antenna coil 21 is arranged so as to surround the disk holding part 236. When the optical disk 3 is fitted to the disk holding part 236, the electromagnetic coupling between the antenna coil 31 on the optical disk 3 side and the antenna coil 21 on the tray side is ensured, and it is possible to send and receive the signals.

Whereas the booster antenna unit 20a is attached to the disk tray 233, the base part 231 and the cover part 232 are formed through the injection molding, and those parts are coupled in the coupling part 234 so as to be rotatable. Then, in a state where the cover part 232 is opened, the disk tray 233 to which the booster antenna unit 20a is fixed is fitted into the inner part of the base part 231 to be fixed in position. At this time, the antenna coil 22 of the booster antenna unit 20a is arranged so as to be closely contacted with the inside of a side face 238 (refer to FIG. 6) on a rotation center side of the base part 231 in a lower part of an end part in a convex part 237 of the disk tray 233.

It should be noted that the antenna coil 22 of the booster antenna unit 20a may be arranged so that, in general, the antenna coil 22 is in contact with (or in proximity to) one of side faces respectively connected to four sides of a tray attaching surface of the base part 231. That is, by exposing the IC reader 1 to the side face which contacts the antenna coil 22, it is possible to communicate with the non-contact type IC chip 32 on the optical disk 3.

It should be noted that in the optical disk case 2 having the above-mentioned configuration, in general, a paper member is arranged in the inner part of the side face on the rotation center side of the cover part 232, and through the side face 238, a title and the like of the content recorded on the optical disk 3 are displayed in many cases. For this reason, when the optical disk case is stored on the storage rack, the side face 238 is often in a state of being exposed to the outside of the storage rack. Also, as the antenna coil 22 is arranged on the side face 238 side, the user contacts the antenna coil 22 when the optical disk 3 is attached or detached, and it is possible to prevent the damage to the optical disk 3 more reliably as compared with a case where the antenna coil 22 is arranged in another side face. From this viewpoint, the antenna coil 22 is highly preferably arranged so as to be in contact with the side face 238.

Figure 8A:
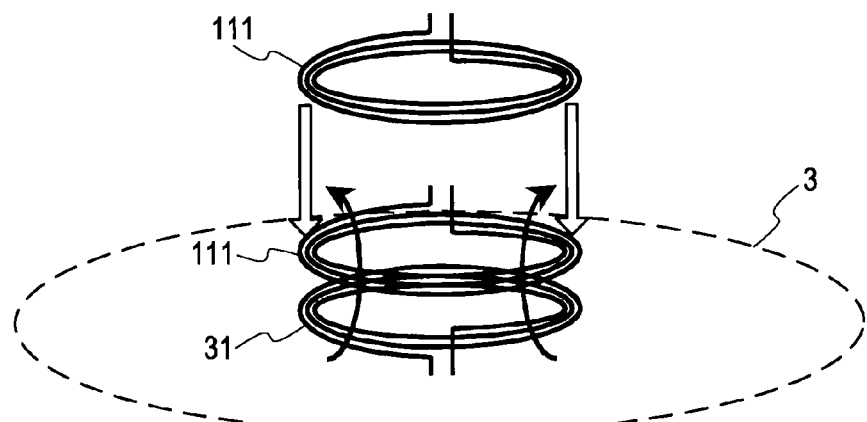
FIGS. 8A and 8B are explanatory diagrams for describing an antenna arrangement on the non-contact type IC chip side and an antenna arrangement on the IC reader side.
Figure 8B:
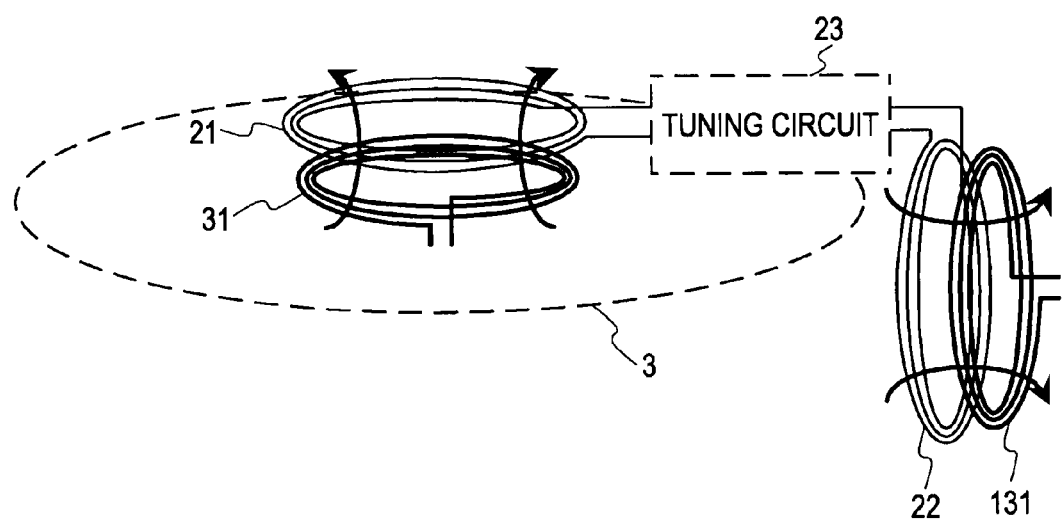

FIGS. 8A and 8B are explanatory diagrams for describing the antenna arrangement on the non-contact type IC chip side and the antenna arrangement on the IC reader side.

In a case where a satisfactory communication is performed with the non-contact type IC chip 32 on the optical disk 3, as illustrated in FIG. 8A, the antenna coil 31 on the optical disk 3 side desirably faces the first antenna coil 111 of the first antenna part portion 11 on the IC reader 1 in proximity, and also the antenna coil 31 and the first antenna coil 111 are mutually located on the same axis. However, as the positional relation between the antenna coil 31 on the optical disk 3 side and the first antenna coil 111 on the IC reader 1 side is deviated from the above-mentioned state, the communication state between the antenna coils is degraded. Then, as illustrated in FIG. 8B, in a state where the first antenna coil 111 of the first antenna part 11 on the IC reader 1 is located on a further outer side of an outer edge of the optical disk 3, and also the axis of the first antenna coil 111 is orthogonal to the axis of the antenna coil 31 on the optical disk 3 side, the communication is extremely difficult in many cases.

In this way, even in the case where the satisfactory communication is extremely difficult due to the positional relation between the respective antennas, by using the booster antenna which functions as the mediation of the communication between the respective antennas, it is possible to perform the satisfactory communication. The booster antenna illustrated in FIG. 8B is configured in such a manner that the antenna coil 21 facing the antenna coil 31 on the optical disk 3 side and the antenna coil 22 facing the second antenna coil 131 of the second antenna part 13 on the IC reader 1 side are mutually connected via the tuning circuit 23. By using such a booster antenna, it is possible to ensure the communication between the antenna coil 31 on the optical disk 3 side and the second antenna coil 131 on the IC reader 1 side.

Figure 9:
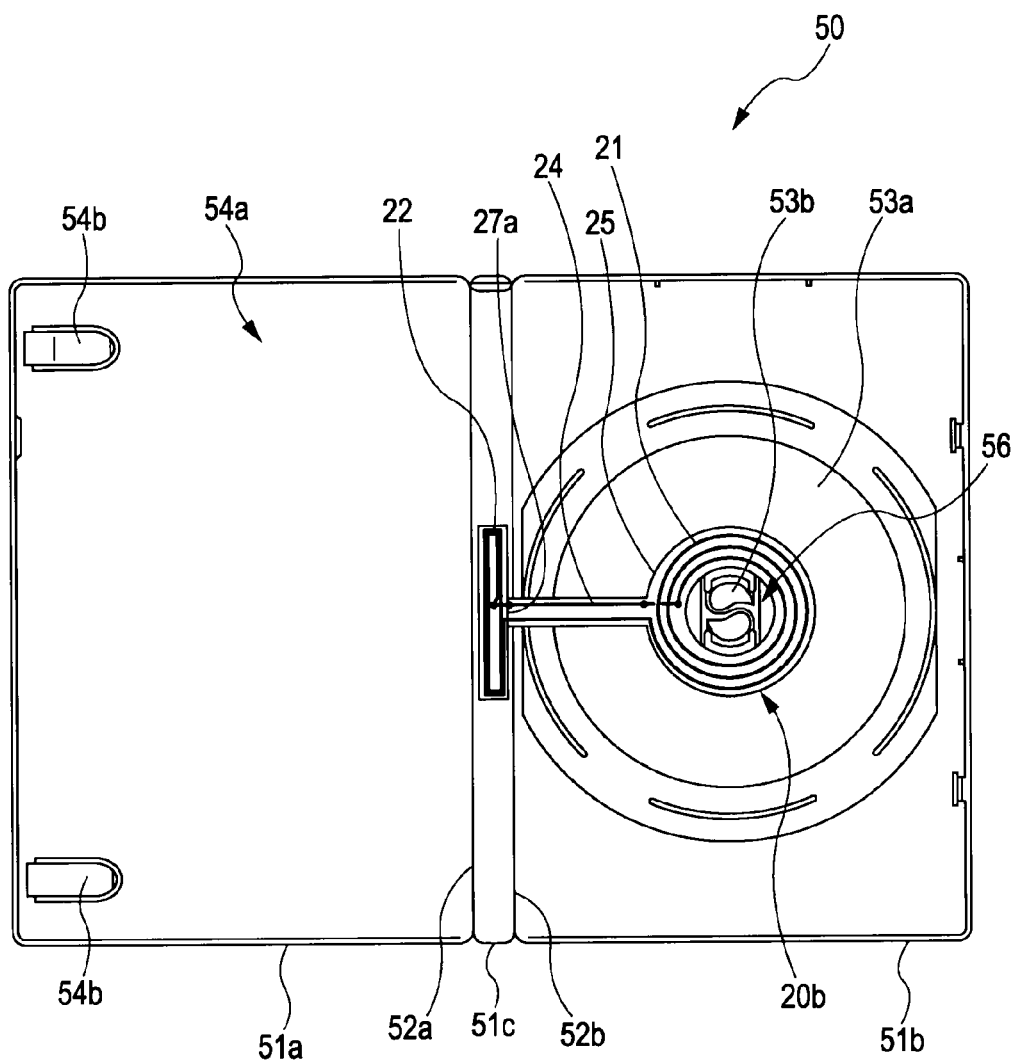
FIG. 9 is a front view of another configuration example of the optical disk case.

FIG. 9 is a front view of another configuration example of the optical disk case.

The optical disk case 50 of FIG. 9 basically has a two-fold box shape including a front face cover part 51a and a back face cover part 51b. The front face cover part 51a and the back face cover part 51b are connected via a case side face part 51c so as to be foldable, and integrally formed of a resin material such as polypropylene, for example. That is, the front face cover part 51a and the back face cover part 51b are folded by 90 degrees in folding parts 52a and 52b which are respectively border parts of the case side face part 51c. At this time, when the front face cover part 51a and the back face cover part 51b are put into the facing state, the inside is sealed up. Also, at this time, the case side face part 51c is put into a state of being perpendicular to the front face cover part 51a and the back face cover part 51b, thus constituting one side face of the optical disk case 50.

On an inner face of the back face cover part 51b, a disk placing surface 53a for placing the optical disk 3 and a convex disk holding part 53b for holding the optical disk 3 are integrally formed. Similarly to the respective embodiments described above, a surrounding of the disk holding part 53b has elasticity. As the center hole 36 of the optical disk 3 is fitted to the disk holding part 53b, the optical disk 3 is held. On the other hand, the inner face of the front face cover part 51a functions as, for example, a brochure storage surface 54a for storing a brochure or the like for describing a content recorded on the optical disk 3. On this surface, convex locking parts 54b for holding and also catching the brochure are formed.

Furthermore, the outer face of the front face cover part 51*a*, the back face cover part 51*b*, and the case side face part 51*c* (that is, the opposite surface of the disk placing surface 53*a* and the brochure storage surface 54*a*) is covered with one transparent sheet (not shown). Three side out of four sides of this transparent sheet are fixed to the end parts of the front face cover part 51*a*, the back face cover part 51*b*, and the case side face part 51*c*, but the remaining one side is open without being fixed. It should be noted that as an example herein, an upper side in FIG. 9 is set as an open end part. Then, from this open end part, it is possible to insert a card member (not shown) for a package display on which a jacket photograph or the like is printed, into the transparent sheet, for example.

The optical disk case 50 having the above-mentioned basic configuration is highly commonly distributed mainly for a DVD storage case, and is called "tall case" or the like. Then, according to the present embodiment, a booster antenna unit 20*b* in which the booster antenna 20 is formed is mounted to the existing optical disk case 50.

The basic configuration of the booster antenna unit 20*b* is similar to the configuration example of the above-mentioned optical disk case, in which the antenna coils 21 and 22 and the connection wiring 24 are formed on the flexible substrate 25. The booster antenna unit 20*b* is fixed to the inner face of the back face cover part 51*b* in a state where the disk holding part 53*b* penetrates through a center hole 56 provided in the center area of the antenna coil 21. At this time, the antenna coil 22 is arranged so as to be in contact with the inner face of the case side face part 51*c* in a state where the optical disk case 50 is closed.

Herein, as the booster antenna unit 20 remains, for example, in the flat state, the entire back face of the flexible substrate 25 is fixed to the inner face of the optical disk case 50. Then, when the optical disk case 50 is closed, in conjunction with the folding of the folding parts 52*a* and 52*b*, the folding part 27*a* at the border between the formation area of the antenna coil 22 and the formation area of the connection wiring 24 is also folded. As a result, when the IC reader 1 is exposed to the outer side of the case side face part 51*c*, the electromagnetic coupling between the second antenna coil 131 of the second antenna part 13 in the IC reader 1 and the antenna coil 22 is established.

Also, after the folding processing by 90 degrees by using the folding part 27*a* as the border is applied in advance, the booster antenna unit 20*b* may be fixed to the inner face of the back face cover part 51*b*. In this case, in the back face of the flexible substrate 25, only the formation areas of the antenna coil 21 and the connection wiring 24 may be fixed to the back face cover part 51*b*.

It should be noted that as an example of the optical disk case having the similar basic configuration to the above-mentioned tall case type, such an optical disk case also exists that in the case inter face, a detachment/attachment part for enabling the detachment/attachment of a memory card provided with a flash memory or the like is provided adjacent to the placing surface of the optical disk 3. It is possible to mount the booster antenna to such an optical disk case too by way of the above-mentioned method.

Next, the operation of the IC reader according to the first embodiment will be described.

Figure 10:
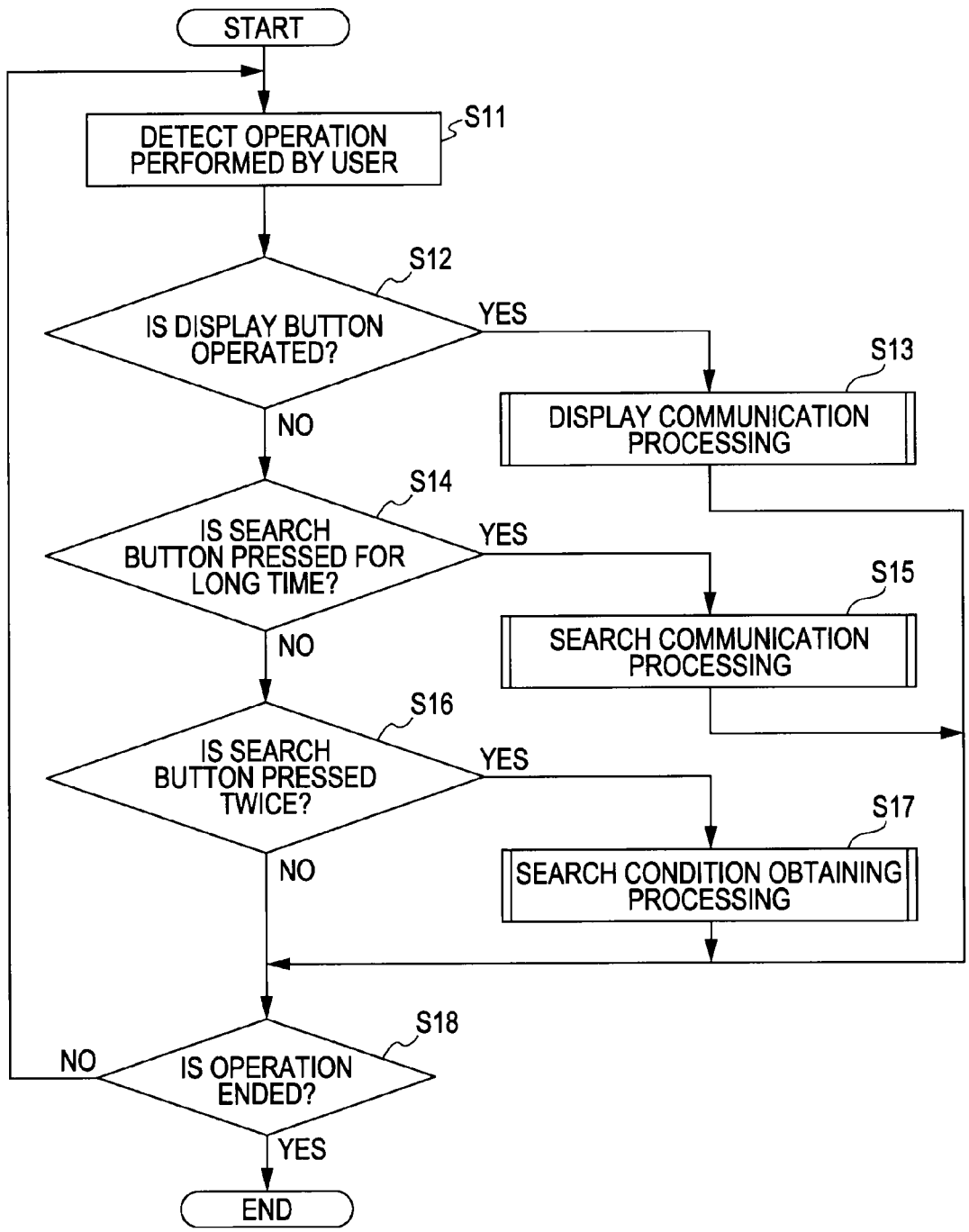
FIG. 10 is a flowchart for describing a main processing executed by the IC reader according to the first embodiment.

FIG. 10 is a flowchart for describing a main processing executed by the IC reader according to the first embodiment.

First, when the operation part 15 is operated by the user, the reader control part 101 of the IC reader 1 detects the operation of the display button 152 performed by the user (step S11).

Next, the reader control part 101 determines whether or not the operation of the display button 152 performed by the user in step 11 (step S12). In a case where the operation of the display button 152 is not detected, the flow is advanced to the processing in step S14. On the other hand, in a case where the operation of the display button 152 is detected, a display communication processing is executed (step S13), and thereafter, the flow is advanced to the processing in step S18. This display communication processing is a processing of displaying the information recorded on the non-contact type IC chip 32 of the optical disk 3, which will be described in detail with reference to FIG. 11.

Next, the reader control part 101 detects whether or not a long-press operation of the search button 153 performed by the user in step S11 is detected (for example, an operation for keeping the press of the search button 153 for 1 second or longer) (step S14). In a case where the long-press operation of the search button 153 is not detected, the flow is advanced to the processing in step S16. On the other hand, in a case where the long-press operation of the search button 153 is detected, a search communication processing is executed (step S15), and thereafter, the flow is advanced to the processing in step S18. This search communication processing is a processing of displaying a search result of the information recorded on the non-contact type IC chip 32 of the optical disk 3, which will be described in detail with reference to FIG. 12.

Next, the reader control part 101 determines whether or not a double-press operation of the search button 153 performed by the user in step S11 is detected (for example, an operation of pressing the search button 153 twice or more within 1 second) (step S16). In a case where the double-press operation of the search button 153 is not detected, the flow is advanced to the processing in step S18. On the other hand, in a case where the double-press operation of the search button 153 is detected, a search condition obtaining processing is executed (step S17), and thereafter, the flow is advanced to the processing in step S18. This search condition obtaining processing is a processing of obtaining a search condition for searching for the information recorded on the non-contact type IC chip 32 of the optical disk 3, which will be described in detail with reference to FIG. 13.

Then, the reader control part 101 repeats the above-mentioned processing in a case where the operation performed by the user is detected (step S18), and in a case where the detection of the operation performed by the user is ended, the reader control part 101 ends the processing.

Next, the display communication processing executed in step S13 in a main processing will be described.

Figure 11:
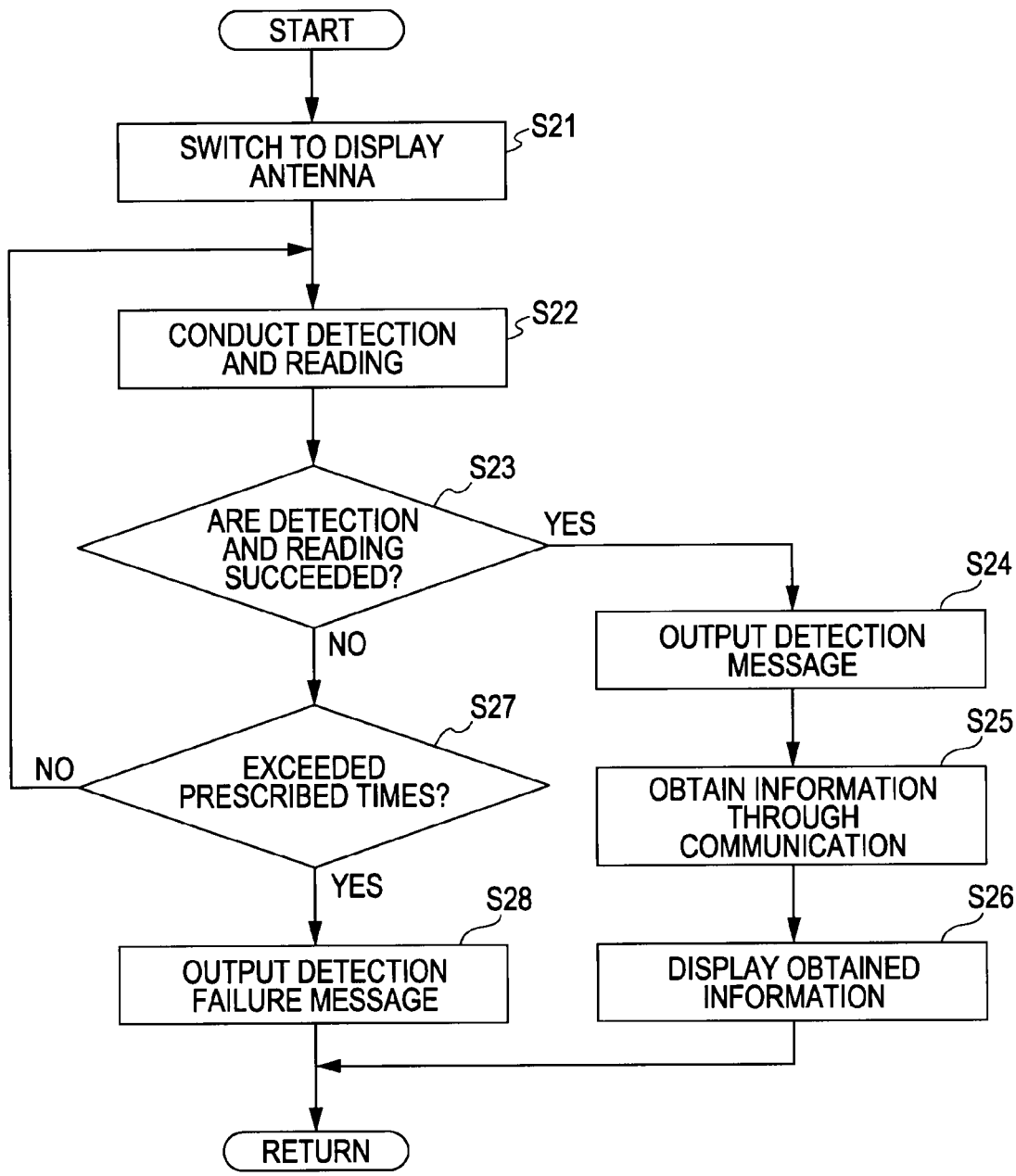
FIG. 11 is a flowchart for describing a display communication processing executed by the IC reader.

FIG. 11 is a flow chart for describing the display communication processing executed by the IC reader.

In the main processing, when the operation of the display button 152 performed by the user is detected, the reader control part 101 executes the display communication processing illustrated in FIG. 11.

First, the reader control part 101 sends to the antenna switching circuit 103, an instruction for switching the connection destination to the first antenna part 11 (step S21), and through the connected first antenna part 11, the detection of the non-contact type IC chip 32 of the optical disk 3 and the reading of the recorded information are conducted (step S22). Then, the reader control part 101 determines whether or not the detection of the non-contact type IC chip 32 and the reading are succeeded (step S23). In a case where the detection and the reading are failed, the flow is advanced to the processing in step S27. On the other hand, in a case where the detection and the reading are succeeded, the flow is advanced to the processing in step S24.

In a case where the detection and the reading are succeeded, the reader control part 101 allows the notification part 16 to output a detection message indicating that the detection of the non-contact type IC chip 32 and the reading of the recorded information are succeeded (step S24), obtains appropriate information recorded on the non-contact type IC chip 32 through the communication with the non-contact type IC chip 32 (step S25), displays the thus obtained information on the indication display 161 provided to the notification part 16 (step S26), and thereafter, returns to the main processing.

In a case where the detection of the non-contact type IC chip 32 or the reading is failed, the reader control part 101 repeats the processing from step S22 to step S23 by the prescribed number of times set in advance (for example, 10 times). Then, the reader control part 101 determines whether or not this repetition exceeds the prescribed times (step S27). In a case where the repetition does not exceed the prescribed times, the flow is advanced to step S22. On the other hand, in a case where the repetition exceeds the prescribed times, the reader control part 101 allows the notification part 16 to output a detection failure message indicating that the detection of the non-contact type IC chip or the reading of the recorded information is failed, and thereafter, returns to the main processing.

Herein, as the detection message and the detection failure message, for example, the audio output part 164 may be allowed to output a predetermined electronic sound or a message based on a synthesized sound. Also, by way of a predetermined light emitting pattern performed by the antenna light emitting part 162 or the projector parts 163, the user may be notified of the success or failure of the detection of the non-contact type IC chip 32 or the reading.

It should be noted that in the above-mentioned step S26, the information obtained from the non-contact type IC chip 32 is displayed on the indication display 161 as it is, and for example, information previously associated with the thus obtained information may be displayed. For example, a table in which an identification number is associated with a song name is held in advance, and when the identification number is obtained from the non-contact type IC chip 32, the corresponding song name may be extracted while referring to the table to be displayed on the indication display 161.

Next, a search communication processing executed in step S15 in the main processing will be described.

Figure 12:
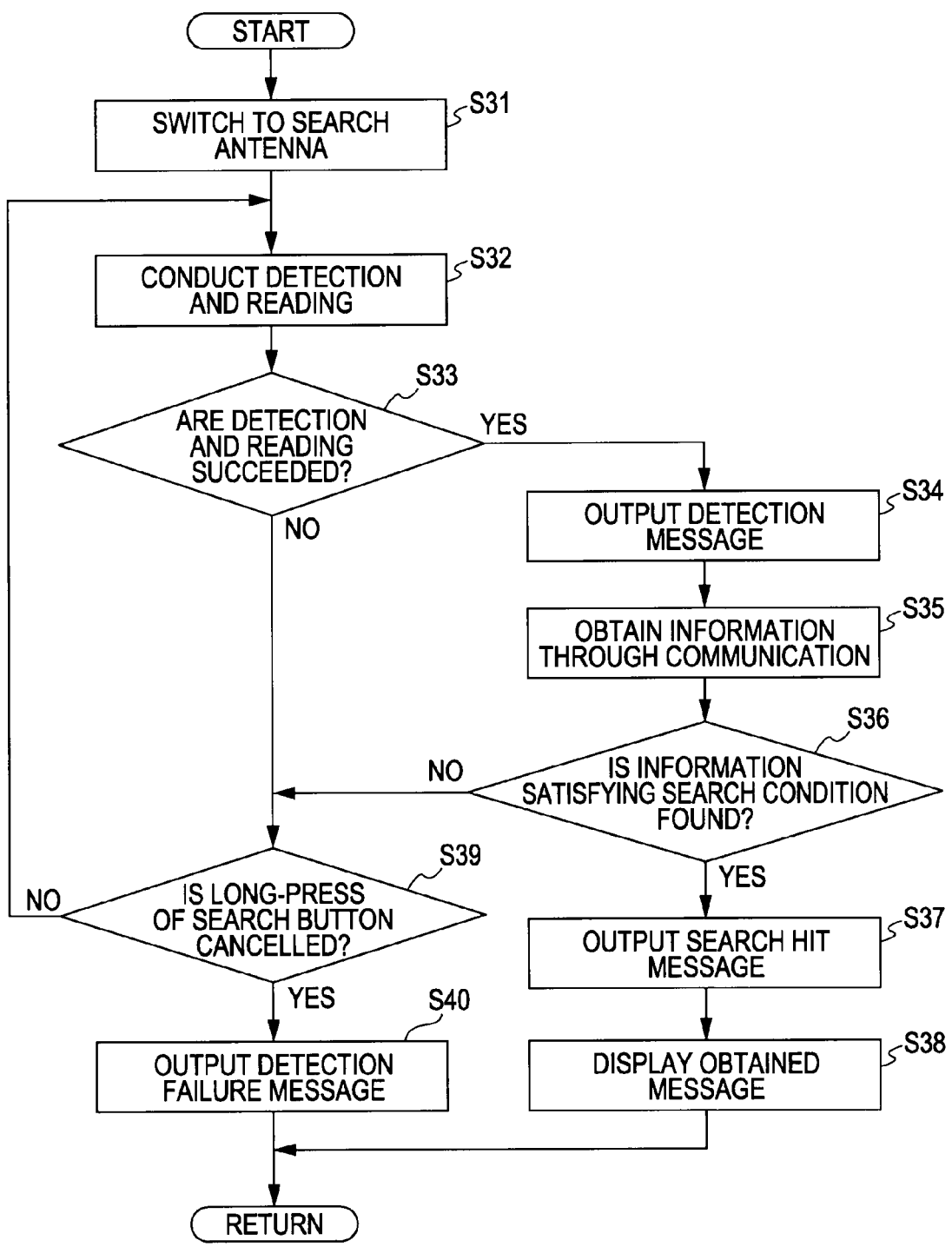
FIG. 12 is a flowchart for describing a search communication processing executed by the IC reader according to the first embodiment.

FIG. 12 is a flowchart for describing the search communication processing executed by the IC reader according to the first embodiment.

In the main processing, when the long-press operation of the search button 153 performed by the user is detected, the reader control part 101 executes the search communication processing illustrated in FIG. 12.

First, the reader control part 101 send to the antenna switching circuit 103, an instruction for switching the connection destination to the second antenna part 13 (step S31), and through the connected second antenna part 13, the detection of the non-contact type IC chip 32 of the optical disk 3 and the reading of the recorded information are conducted (step S32). Then, the reader control part 101 determines whether or not the detection of the non-contact type IC chip 32 and the reading are succeeded (step S33). In a case where the detection and the reading are failed, the flow is advanced to the processing in step S39. On the other hand, in a case where the detection and the reading are succeeded, the flow is advanced to the processing in step S34.

In a case where the detection and the reading are succeeded, the reader control part 101 allows the notification part 16 to output a detection message indicating that the detection of the non-contact type IC chip 32 and the reading of the recorded information are succeeded (step S34), and obtains appropriate information recorded on the non-contact type IC chip 32 through the communication with the non-contact type IC chip 32 (step S35).

Figure 13:
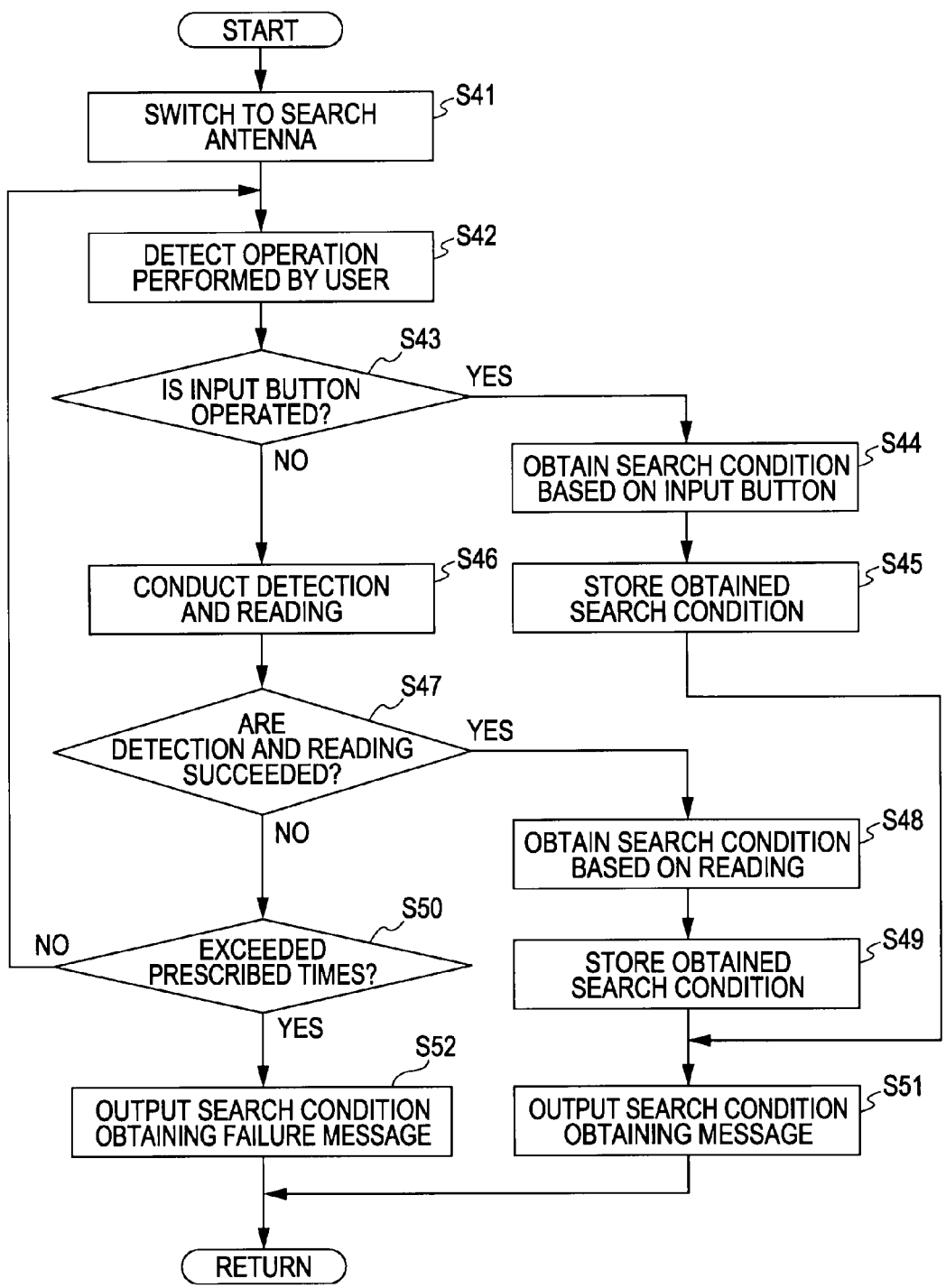
FIG. 13 is a flowchart for describing a search condition obtaining processing executed by the IC reader.

Next, the reader control part 101 determines whether or not the search for the thus obtained information on the basis of the search condition obtained through the search condition obtaining processing in FIG. 13 and the information corresponding to the search condition is found (step S36). In a case where the information corresponding to the search condition is not found, the reader control part 101 advances to the processing in step S39. On the other hand, in a case where the information corresponding to the search condition is found, the reader control part 101 allows the notification part 16 to output a search hit message indicating that the information corresponding to the search condition is recorded on the non-contact type IC chip 32 (step S37), displays the thus obtained information on the indication display 161 provided to the notification part 16 (step S38), and thereafter, returns to the main processing.

In a case where the detection of the non-contact type IC chip 32 or the reading is failed in step S33 or in a case where the information corresponding to the search condition is not found from the non-contact type IC chip 32 in step S36, the reader control part 101 determines whether or not the long-press of the search button 153 performed by the user is cancelled (step S39). In a case where the long-press is not cancelled, the flow is advanced to the processing in step S32. With this configuration, while the user presses the search button 153 for a long period of time, the processing from step S32 to step S36 is repeated. On the other hand, in a case where the long-press is cancelled, the reader control part 101 allows the notification part 16 to output the detection failure message indicating that the detection of the non-contact type IC chip or the reading of the recorded information is failed (step S40), and thereafter, returns to the main processing.

Herein, as the detection message, the detection failure message, and the search hit message, similarly to the detection message in step S24 in the display communication processing (FIG. 11) or the like, for example, the audio output part 164 may be allowed to output a predetermined electronic sound or a message based on a synthesized sound. Also, through a predetermined light emitting pattern of the antenna light emitting part 162 or the projector parts 163, the user may be notified of the success or failure of the detection of the non-contact type IC chip and the reading or the finding of the information corresponding to the search condition.

Next, a search condition obtaining processing executed in step S17 in the main processing will be described.

FIG. 13 is a flowchart for describing the search condition obtaining processing executed by the IC reader.

In the main processing, when the double-press operation of the search button 153 performed by the user is detected, the reader control part 101 executes the search condition obtaining processing illustrated in FIG. 13.

First, the reader control part 101 sends to the antenna switching circuit 103, an instruction for switching the connection destination to the second antenna part 13 (step S41). It should be noted that in this search condition obtaining processing, instead of the second antenna part 13, the connection destination may be switched to the first antenna part 11 to obtain the search condition through the first antenna part 11.

Next, when the operation part 15 is operated by the user, the reader control part 101 detects the operation of the display button 152 performed by the user (step S42).

Next, the reader control part 101 determines whether or not the operation of the input buttons 151 performed by the user is detected in step S42 (step S43). In a case where the operation of the input buttons 151 is not detected, through the connected second antenna part 13, the detection of the non-contact type IC chip 32 of the optical disk 3 and the reading of the recorded information are conducted (step S46), and the flow is advanced to the processing in step S47. On the other hand, in a case where the operation of the input buttons 151 is detected, the input of the search condition is accepted by detecting the operation of the input buttons 151 performed by the user, and the search condition is obtained (step S44). The thus obtained search condition is stored in the RAM in the reader control part 101 (step S45), and the flow is advanced to the processing in step S51.

Next, in step S47, the reader control part 101 determines whether or not the detection of the non-contact type IC chip 32 and the reading are succeeded in step S46 (step S47). In a case where the detection and the reading are failed, the flow is advanced to the processing in step S50. On the other hand, in a case where the detection and the reading are succeeded, the search condition is obtained from the information stored in the non-contact type IC chip 32 through the second antenna part 13 (step S48). The thus obtained search condition is stored in the RAM in the reader control part 101 (step S49), and the flow is advanced to the processing in step S51.

Next, in step S51, the reader control part 101 allows the notification part 16 to output a search condition obtaining message indicating that the obtaining of the search condition is succeeded (step S51), and thereafter, returns to the main processing.

In a case where the detection and the reading are failed in step S47, the reader control part 101 repeats the processing from step S42 to step S47 by the prescribed number of times set in advance (for example, 10 times). Then, the reader control part 101 determines whether or not this repetition exceeds the prescribed times (step S50). In a case where the repetition does not exceed the prescribed times, the flow is advanced to step S42. On the other hand, in a case where the repetition exceeds the prescribed times, the reader control part 101 allows the notification part 16 to output a search condition obtaining failure message indicating that the obtaining of the search condition is failed, and thereafter, returns to the main processing.

Herein, as the search condition obtaining message and the search condition obtaining failure message, similarly to the detection message in step S24 in the display communication processing (FIG. 11) or the like, for example, the audio output part 164 may be allowed to output a predetermined electronic sound or a message based on a synthesized sound. Also, through a predetermined light emitting pattern of the antenna light emitting part 162 or the projector parts 163, the obtaining success or obtaining failure of the search condition may be notified.

Next, a state in which the IC reader according to the present embodiment searches for the information stored in the non-contact type IC chip mounted to the optical disk will be described.

First, a state in which the IC reader detects the non-contact type IC chip of the optical disk stored in the above-mentioned optical disk case will be described.

Figure 14:
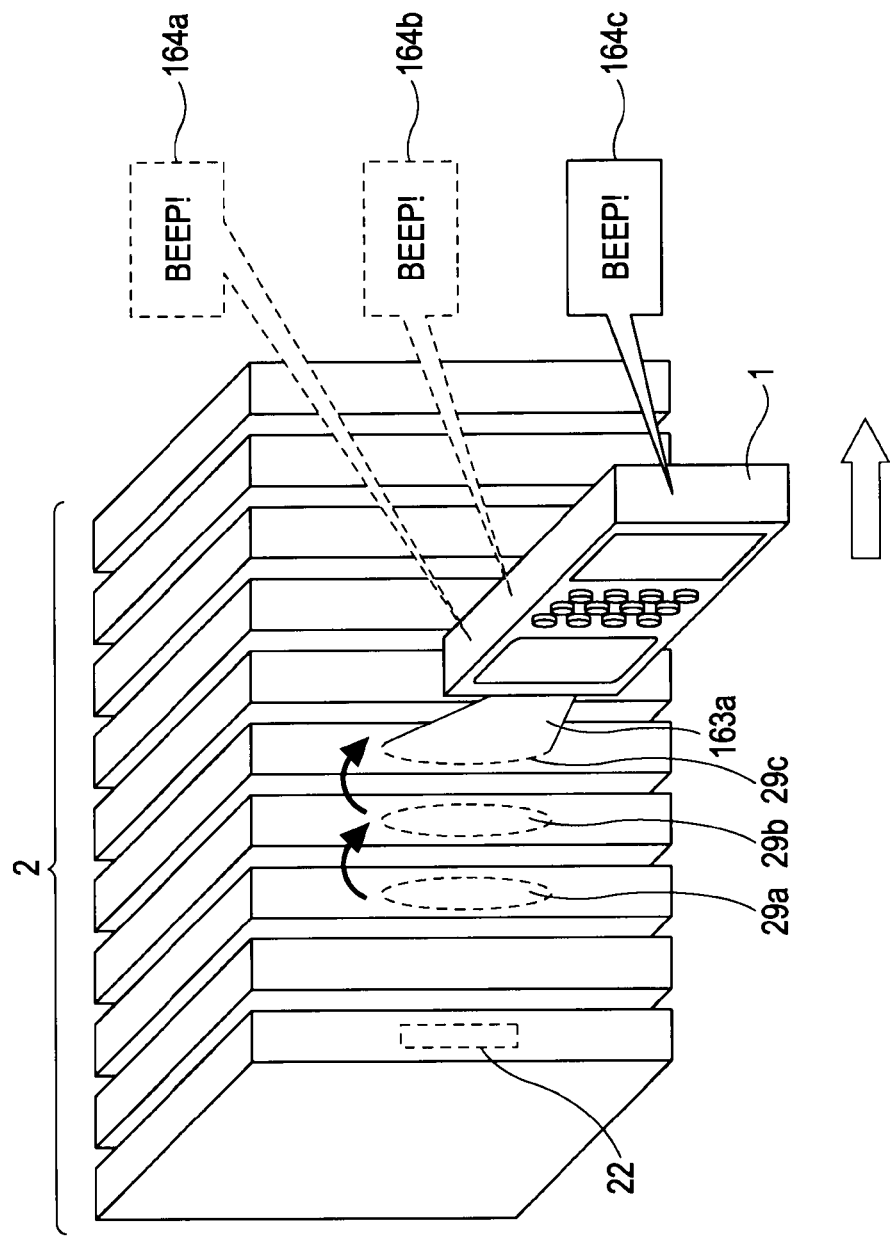
FIG. 14 illustrates a state in which the optical disk to which the non-contact type IC chip is mounted and which is stored in the optical disk case is detected by the IC reader.

FIG. 14 illustrates a state in which the IC reader detects the optical disk on which the non-contact type IC chip is mounted and which is stored in the optical disk case.

For example, in the past, as in FIG. 14, in a case where a large number of the optical disk cases for storing the optical disk on which the non-contact type IC chip is mounted are arranged alongside in a standing manner, when the information recorded on the non-contact type IC chip of the optical disk is read, in order to establish the communication, each of the optical disk cases is grasped by hand or the stored optical disk is taken out and the IC reader is exposed to the antenna coil of the non-contact type IC chip arranged on the disk surface of the optical disk.

In contrast to this, in a case where a large number of the optical disk cases 2 on which the above-mentioned booster antenna 20 is mounted are arranged in the above-mentioned manner, by sequentially putting the second antenna coil 131 on the front face of the IC reader 1 closer to the antenna coil 22 of the booster antenna 20 arranged on the side face of the respective optical disk cases 2, it is possible to read the recorded information from the non-contact type IC chip 32 of the optical disk 3. Therefore, it is possible to read the information recorded on the non-contact type IC chip 32 without touching the optical disk 3 or the optical disk case 2 by hand.

Hereinafter, a state in which the IC reader 1 according to the present embodiment and the optical disk 3 and the optical disk case 2 described above are combined to be used for the search for the information recorded in the non-contact type IC chip 32 will be described.

The optical disk cases 2 are respectively provided with the above-mentioned booster antenna unit. On the side face side of the optical disk case 2 (the front side in FIG. 14), the antenna coil 22 on the IC reader side of the booster antenna unit is provided.

As described in FIG. 12, as the user sequentially exposes the second antenna part 13 provided on the front face to the antenna coils 22 of the respective optical disk case 2 (from the left to the right in the example in FIG. 14) while performing the long press of the search button 153 of the IC reader 1, it is possible to read the information recorded on the non-contact type IC chips 32 mounted to the respective optical disks 3. At this time, the non-contact type IC chip of the optical disk 32 is detected from the notification part 16 of the IC reader 1, and the detection message for notifying the success of the communication is output. To be more specific, the detection message is an irradiation light 163*a* irradiated from the projector parts 163 of the IC reader 1, audio messages 164*a* to 164*c* output from an audio output part, and the like.

The IC reader 1 outputs a particular light emitting pattern of the irradiation light 163*a* (for example, each time the light is emitted each time the IC reader 1 detects the non-contact type IC chip 32 and the communication is succeeded, the irradiation light 163*a* is output), a particular sound of the audio messages 164*a* to 164*c* (for example, each time the IC reader 1 detects the non-contact type IC chip 32 and the communication is succeeded, an electronic sound "beep!" is output), and the like. With these configurations, it is possible to notify the user of the detection of the non-contact type IC chip 32 and the success of the communication. Also, at this time, the irradiation light 163*a* is projected to the optical disk case 2 which is the detection target of the IC reader 1, and it is therefore possible to allow the user to easily recognize which optical disk case 2 the IC reader 1 is currently conducting the communication with.

Also, due to the configuration and arrangement of the optical disk cases 2, even in a case where it is difficult to visually recognize the presence or absence of the inside optical disk from the outside of the optical disk case 2, it is possible to notify the user by way of the detection message from the notification part 16 that the optical disk 3 to which the non-contact type IC chip 32 is mounted is stored inside the optical disk case 2.

At this time, when the optical disk 3 to which the non-contact type IC chip 32 is mounted is not stored in the optical disk case 2, the detection message is not output. With this configuration, it is possible to allow the user to recognize that the optical disk case 2 is empty or the optical disk stored in the optical disk case has no non-contact type IC chip 32 mounted thereto.

It should be noted that the projector parts 163 which output the detection message of the IC reader 1 may be composed of an ultraviolet ray LED which emits ultraviolet rays or the like, and also a part of the optical disk case 2 where the antenna coil 22 on the rear face side is arranged may be applied with light accumulation coating such as LumiNova (registered trademark) which accumulates light when irradiation of the ultraviolet rays is received. With this configuration, when the irradiation light 163*a* of the ultraviolet rays output as the detection message from the projector parts 163 of the IC reader 1 is received, like light reception parts 29*a* to 29*c* in FIG. 14, the light emission continues for a while. Thus, it is possible to allow the user to more clearly recognize the optical disk case 2 storing the optical disk which is detected by the IC reader 1 and on which the non-contact type IC chip 32 whose communication is succeeded.

Then, at the time of the execution of the search communication processing in FIG. 12, the IC reader 1 which has succeeded the detection and the communication of the non-contact type IC chip 32 searches for the information stored in the non-contact type IC chip 32.

It should be noted that in a case where the optical disk cases 2 are horizontally laid down and piled up lengthways, when the user uses the IC reader 1 in a state of being rotated by 90 degrees to the right or the left while setting the back and forth direction as an axis, it is possible to realize the similar effects.

Next, a state in which the information stored in the above-mentioned non-contact type IC chip of the optical disk is searched for by the IC reader will be described.

Figure 15:
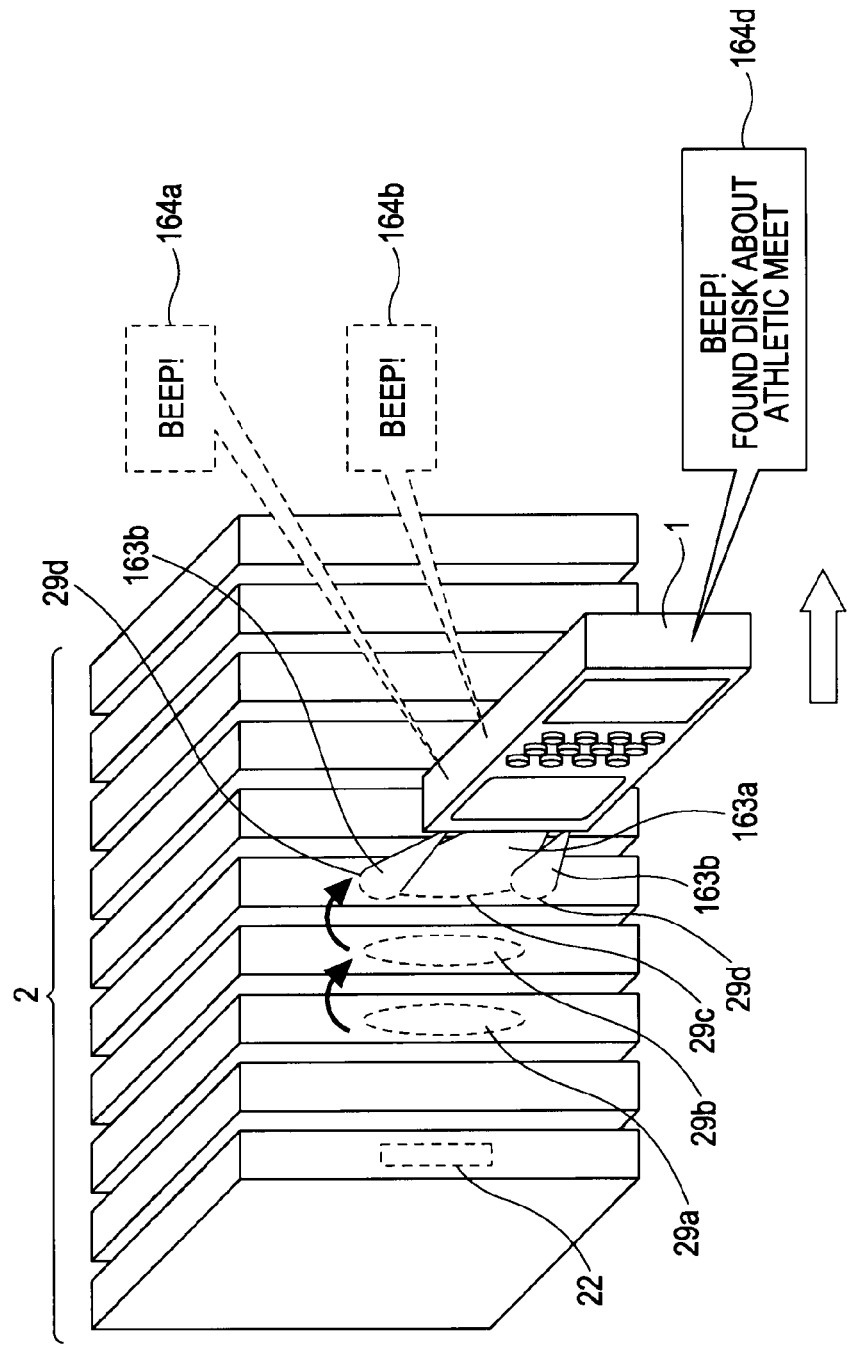
FIG. 15 illustrates a state in which a search for information recorded on the non-contact type IC chip of the optical disk stored in the optical disk case is succeeded.

FIG. 15 illustrates a state when the search for the information recorded on the non-contact type IC chip of the optical disk stored in the optical disk case is succeeded.

As described above in FIG. 14, at the time of the search, when the detection and communication of the information recorded on the non-contact type IC chip 32 mounted to the optical disk 3 stored in the optical disk case 2 are succeeded, the IC reader 1 performs the search for the information stored in the non-contact type IC chip 32 to determine whether or not the information corresponding to the search condition exists.

Then, as a result of this search, in a case where the information corresponding to the search condition stored on the non-contact type IC chip 32 does not exist, only the above-mentioned detection message such as the audio messages 164*a* and 164*b* from the IC reader 1 or the irradiation light 163*a* is output, and in accordance with the search execution of the non-contact type IC chip 32, a message related to the search is not output from the notification part 16 of the IC reader 1.

On the other hand, as a result of the search, in a case where the information corresponding to the search condition stored on the non-contact type IC chip 32 exists, a search success message for notifying the user that the search is succeeded, which is different from the detection message, is output from the notification part 16 of the IC reader 1. To be more specific, the search success message is an irradiation light 163*b* having a different pattern from the irradiation light 163*a* which is irradiated from the projector parts 163 of the IC reader 1, an audio message 164*d* which is different from the audio messages 164*a* to 164*c* output from the audio output part, or the like.

In this way, the IC reader 1 can notify the user of the success of the search for the information stored in the non-contact type IC chip 32 through the particular light emitting pattern of the irradiation light 163*a* which is different from the detection message (for example, in a case the IC reader 1 has succeeded the search for the information stored in the non-contact type IC chip 32, the irradiation light 163*b* is output while another light emitting part emits light in a different color from the detection message), the particular audio message 164*d* which is different from the audio messages 164*a* to 164*c* (for example, in a case the IC reader 1 has succeeded the search for the information including a keyword "athletic meet" from the information stored in the non-contact type IC chip 32, a synthesized sound "found disk about athletic meet") or the like.

With this configuration, the user can search for the information recorded on the non-contact type IC chip 32 on which the optical disk 3 is mounted while following the search condition without touching the plurality of arranged optical disk cases 2 and can also easily recognize the search result.

It should be noted that as another light emitting pattern of the irradiation light 163*a* in the projector parts 163, such a configuration may be adopted. That is, the IC reader 1 is first kept emitting the light, at the time of the detection of the non-contact type IC chip 32 and the success of the communication, the light is projected at a predetermined light emitting pattern (for example, a blinking at a long cycle), and furthermore, at the time of the success of the search for the information stored in the non-contact type IC chip 32, the light is projected at a further different light emitting pattern (for example, a blinking at a short cycle).

Also, similar to the detection message, the projector parts 163 of the IC reader 1 which outputs the search success message may be composed of the ultraviolet ray LED which emits the ultraviolet rays or the like, and also a part of the optical disk case 2 where the antenna coil 22 on the rear face side is arranged may be applied with light accumulation coating such as LumiNova (registered trademark) which accumulates light when irradiation of the ultraviolet rays is received. With this configuration, when the irradiation light 163*b* of the ultraviolet rays output as the search success message from the projector parts 163 of the IC reader 1 is received, like a light reception part 29*d* in FIG. 15, even when the irradiation light 163*b* is no longer irradiated, the light is kept being emitted for a while. Therefore, it is possible to allow the user to more clearly recognize the optical disk case 2 which stores the optical disk 3 to which the non-contact type IC chip 32 is mounted where the information search based on the IC reader 1 is succeeded.

Next, information recorded on the non-contact type IC chip mounted to the optical disk will be described.

FIGS. 16 to 19 illustrate disk main information and disk auxiliary information recorded on the non-contact type IC chip.

The IC reader 1 according to the present embodiment has a function of determine whether or not the information corresponding to the search condition exists from the information recorded on the non-contact type IC chip 32 for the user to perform the search for the content recorded on the optical disk 3 such as a video file, a data file, a program file, a music file, and the like. Herein, the information recorded on the non-contact type IC chip 32 which is used for the search by using the IC reader 1 will be described.

The information recorded on the non-contact type IC chip 32 of the optical disk 3 is composed, as illustrated in FIGS. 16 to 19, of disk main information 411 to 414 and disk auxiliary information 421 to 424.

Figure 16:
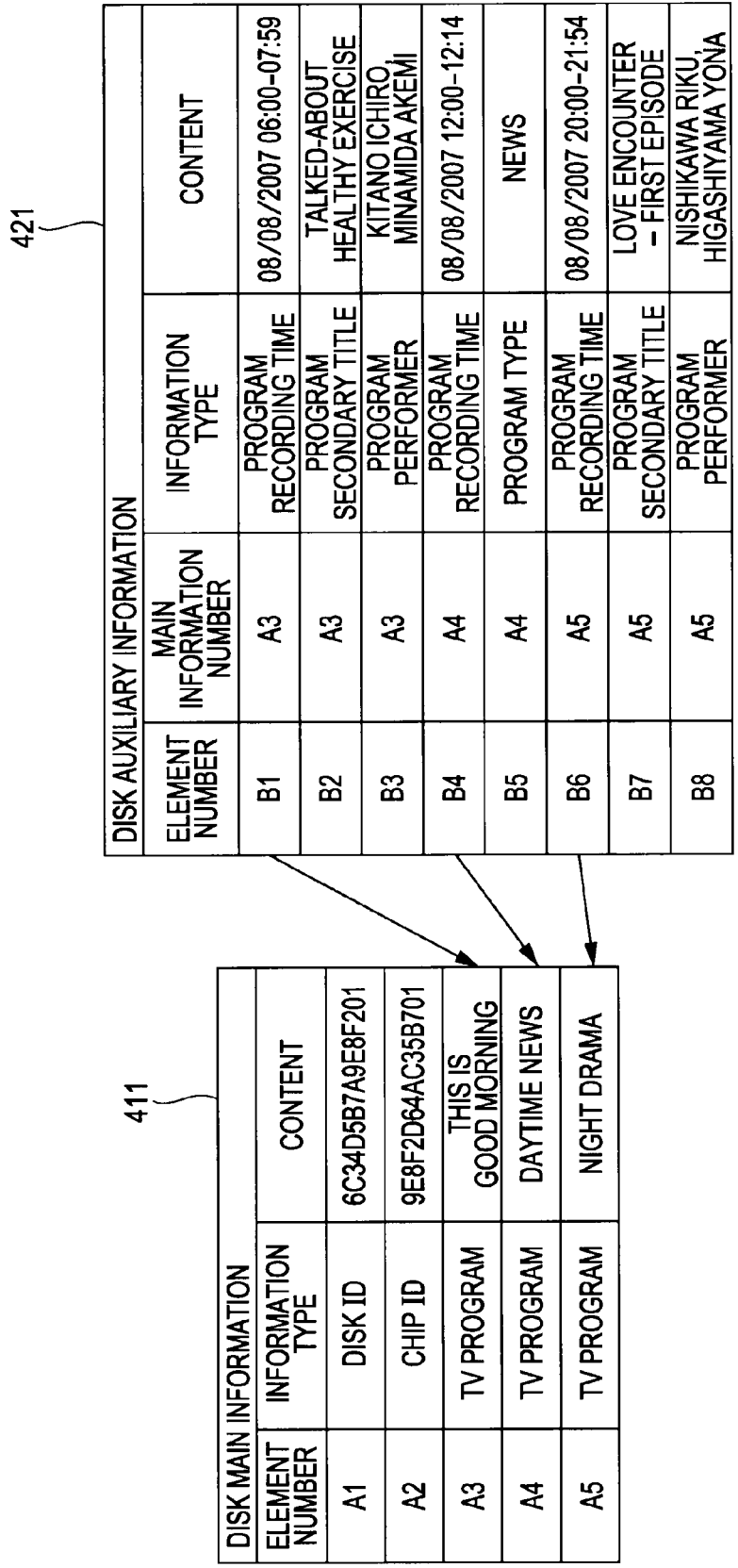
FIG. 16 illustrates disk main information and disk auxiliary information recorded on the non-contact type IC chip (part 1)
Figure 19:
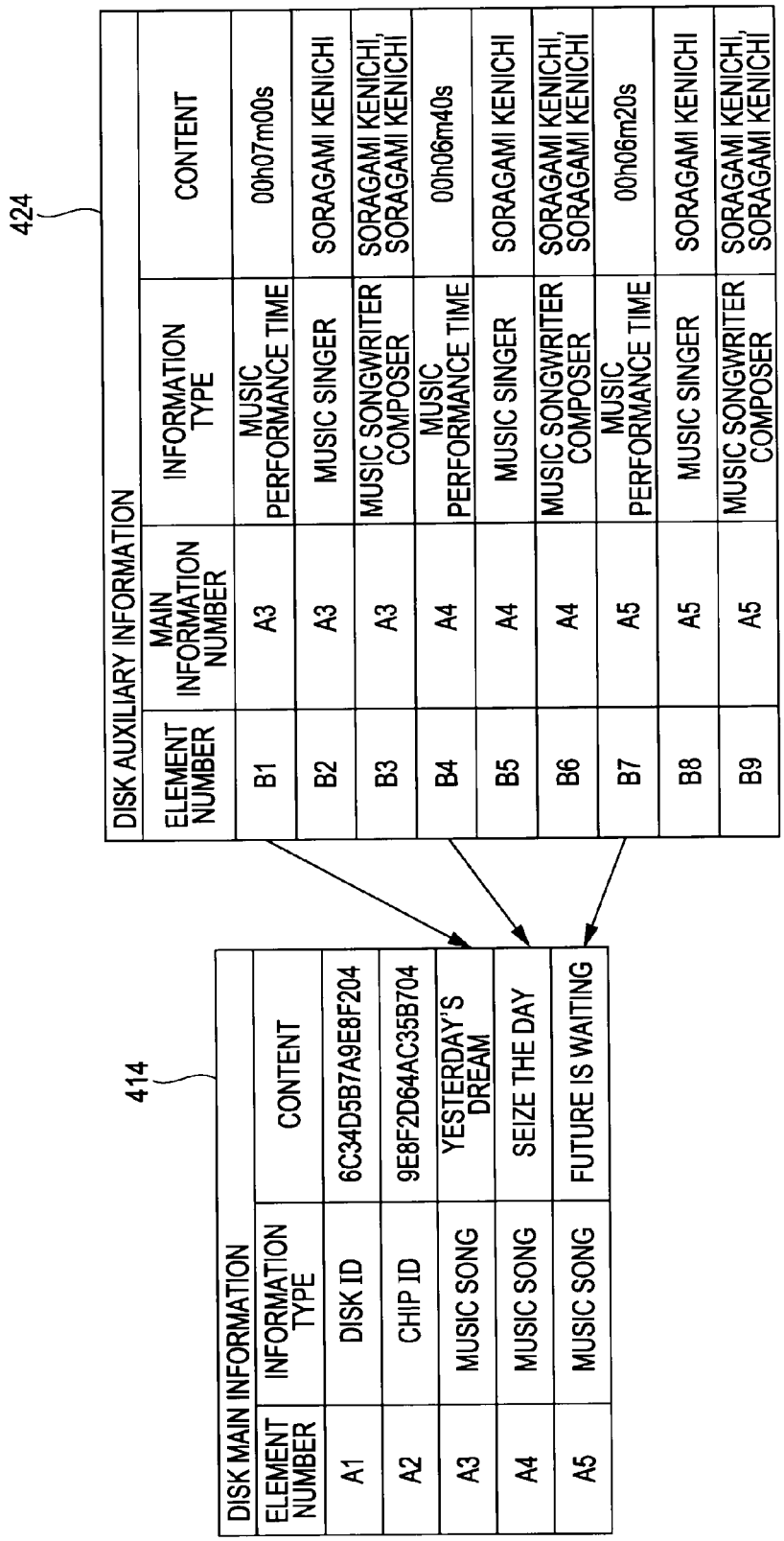
FIG. 19 illustrates the disk main information and the disk auxiliary information recorded on the non-contact type IC chip (part 4)

The disk main information 411 to 414 is composed of three pieces of information, for example, as illustrated in FIG. 16, "element number", "information type", and "content". The information pieces arranged in the horizontal direction are associated with each other and stored in a disk main information table stored in the non-contact type IC chip 32.

The element number is a number allocated for identifying the respective pieces of the disk main information stored in the disk main information table. The element number is uniquely allocated in the respective non-contact type IC chips 32 to the associated respective pieces of the disk main information stored.

The information type is information indicating which type of information the disk main information is. The information type includes, for example, "chip ID" which is a symbol for identifying the non-contact type IC chip 32, "disk ID" which is a symbol for identifying the optical disk on which the non-contact type IC chip 32 is mounted, "TV program" indicating that the disk main information is associated with the video data which records the TV program, "music song" indicating that the disk main information is associated with the music data which records the music song, and the like. It should be noted that the types of the information type are not limited to the above and can be decided as occasion demands.

The content is information indicated by the disk main information. This content is stored in accordance with the information type. For example, in a case where the information type is "disk ID" or "chip ID", a symbol indicating the disk ID or a symbol indicating the chip ID is stored. In a case where the information type is "TV program" or "music song", a title of the TV program or a title of the music song is stored.

The disk auxiliary information 421 to 424 is composed of four pieces of information, for example, as illustrated in FIG. 16, "element number", "main information number", "information type", and "content". The information pieces arranged in the horizontal direction are associated with each other and stored in the disk main information table which is stored on the non-contact type IC chip 32. The disk auxiliary information 421 to 424 are information used for the search for the content recorded on the optical disk 3. According to the present embodiment, the disk auxiliary information 421 to 424 are provided in subordination to the above-mentioned TV program and music song of the disk main information.

The element number is a number allocated to identify the respective pieces of the disk auxiliary information stored in a disk auxiliary information table. The element number is uniquely allocated to the associated respective pieces of the disk auxiliary information within the respective non-contact type IC chips 32. The main information number is a number for identifying the disk main information on which the disk auxiliary information depends. As the main information number, the element number of the disk main information is used. With the main information number, at least one of disk auxiliary information is associated with one disk main information.

The information type is information indicating which type of information the disk auxiliary information is. The information type includes, for example, "program recording time", "program secondary title", "program type", "program performer", and the like in a case where the disk auxiliary information relates to a TV program. In a case where the disk auxiliary information relates to a music song, the information type includes "music performance time", "music singer", "music songwriter composer", and the like. It should be noted that the types of the information type are not limited to the above and can be decided as occasion demands.

The content is information indicated by the disk auxiliary information. This content is stored in accordance with the information type. For example, in a case where the information type is "program recording time", a recording start time and a recording end time of the TV program are stored. In a case where the information type is "program secondary title", a secondary title of the TV program is stored. In a case where the information type is "program type", a type of the TV program such as "news" or "sport" is stored. In a case where the information type is "program performer", a performer of the TV program is stored. In a case where the information type is "music performance time", a recording time of the music performance is stored. In a case where the information type is "music singer", a singer of the music is stored. In a case where the information type is "music songwriter composer", a songwriter and a composer of the music are stored.

The IC reader 1 according to the present embodiment can search for the content recorded on the optical disk 3 on the basis of the disk main information and the disk auxiliary information recorded on the non-contact type IC chip 32 of the optical disk 3.

Next, searches performed by the IC reader 1 according to the present embodiment and search display screens displayed on the indication display 161 of the IC reader 1 at the time of the search will be described.

FIGS. 20 to 25 illustrate search display screens displayed on the indication display.

Search display screens 431 to 436 are roughly composed of "detection information column", "search keyword column", and "history column".

The detection information column is composed of "chip ID column", "search result column", and "coincidence rate display column".

The chip ID column is a column where the chip ID of the disk main information (refer to FIGS. 16 to 19) which is obtained through the communication with the non-contact type IC chip 32 in a case where the IC reader 1 detects the non-contact type IC chip 32.

The search result column is a column where, as the result of the search for the information recorded on the non-contact type IC chip 32 performed by the IC reader 1 o the basis of the search condition, in a case where the information corresponding to the search condition is found, the found information and information related to the found information are displayed.

The coincidence rate display column is a column where the coincidence rate which is the evaluation value for a degree of coincidence of the search result based on the search keyword as to the information corresponding to the search condition when the IC reader 1 searches for the information recorded on the non-contact type IC chip 32 on the basis of the search result. The coincidence rate is calculated, for example, by using a ratio of the number of items matching with the search keyword regarding the information corresponding to the search condition to the number of items of the disk main information and the disk auxiliary information of the search target, but the present invention is not limited to the above, and it is possible to use another criterion.

The search keyword column is composed of "keyword column" and "search item selection button". The keyword column is a column for inputting a keyword constituting the search condition. The search item selection button is a selection button for inputting a specification of the search target constituting the search condition.

It should be noted that the search condition may be obtained through the external communication part 17, for example, from an external information terminal apparatus such as a mobile phone.

The history column is provided with "search history tab" and "detection history tab". When the search history tab is selected, the keywords searched for in the past are displayed.

When the detection history tab is selected, the information detected in the past is displayed. By selecting and copying the phrase displayed on the search history tab and the detection history tab, it is possible to use the phrase as the keyword for the search.

FIG. 20 illustrates the search display screen 431 in a case where the keyword is set as "Kitano Ichiro" to perform the search about "person" in a state where the optical disk 3 is not detected. Herein, for example, a case where the search about "person" is set is equivalent to the following situation. That is, the keyword search is set to be performed from the information related to the person including "program performer", "music singer", "music songwriter composer", and the like as the information types among the disk main information 411 to 414 and the disk auxiliary information 421 to 424 recorded on the non-contact type IC chip illustrated in FIGS. 16 to 19.

FIG. 21 illustrates the search display screen 432 in a case where the keyword is set as "Kitano Ichiro" to perform the search about "person" in a state where the optical disk 3 (refer to FIG. 17) whose chip ID is "9E8F2D64AC35B702" is detected but the information corresponding to the search condition is not found. That is, a case is equivalent to such a situation that with respect to the information storage state exemplified in FIG. 17, as the information type, "Kitano Ichiro" is not stored among the information related to the person such as "program performer", "music singer", and "music songwriter composer".

FIG. 22 illustrates the search display screen 433 in a case where the keyword is set as "Kitano Ichiro" to perform the search about "person" in a state where the optical disk 3 (refer to FIG. 16) whose chip ID is "9E8F2D64AC35B701" is detected and the information corresponding to the search condition is found. That is, with respect to the information storage state exemplified in FIG. 16, the information corresponding to the search condition is found in the element number B3 which is "program performer" as the information type in the disk auxiliary information 421, and "TV program" and "This is good morning" are search results which are in the element number A3 in the disk main information 411.

FIG. 23 illustrates the search display screen 434 in a case where the keyword is set as "Kitano Ichiro" to perform the search about "person" in a state where the optical disk 3 whose chip ID is "9E8F2D64AC35B703" is detected and the information corresponding to the search condition is found. In this case, such a situation is displayed that with respect to the information storage state exemplified in FIG. 18, information "Kitano Jiro" similar to the search condition (information of only one part different from "Kitano Ichiro") is found in the element number B3 which is "program performer" as the information type in the disk auxiliary information 423, and although the coincidence rate of the search result is as low as "25", "TV program" and "baseball live telecast" of the element number A3 in the disk main information 413 are similar search results.

Figure 24:
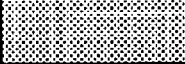
FIG. 24 illustrates the search display screen displayed on the indicating display (part 5)

FIG. 24 illustrates the search display screen 435 in a case where the keyword is set as "Soragami Kenichi" to perform the search about "all" in a state where the optical disk 3 (refer to FIG. 17) whose chip ID is "9E8F2D64AC35B702" is detected the information corresponding to the search condition is found. In this case, such a situation is displayed that with respect to the information storage state exemplified in FIG. 17, as a result of the search for all the information types, the information corresponding to the search condition is found in the element number B9 in the disk auxiliary information 422, and the keyword corresponds to the search result with the low coincidence rate as the composer of "music song" and "it will be fine tomorrow" in the element number A5 in the disk main information 412.

FIG. 25 illustrates the search display screen 436 in a case where the keyword is set as "Soragami Kenichi" to perform the search about "all" in a state where the optical disk 3 whose chip ID is "9E8F2D64AC35B704" (refer to FIG. 19) is detected and the information corresponding to the search condition is found. That is, such a situation is displayed that with respect to FIG. 18, as a result of the search for all the information types, the information corresponding to the search condition is found in the element numbers B2, B3, B5, B6, B8, and B9 in the disk auxiliary information 424, and three "music songs" in the element numbers A3, A4, and A5 in the disk main information 414 are the search results.

With the IC reader 1 according to the first embodiment 1 described above, the optical disk case 2 stores therein the optical disk 3 provided with the non-contact type IC chip 32 and the non-contact communication antenna coil 31 formed at the core of the rotation center of the optical disk 3, the optical disk case 2 being provided with the booster antenna 20 for supporting the communication with the non-contact type IC chip of the optical disk 32 on the side face, and in a state where the optical disk case 2 is closed, by putting the second antenna of the information reading apparatus closer to the case side face where the booster antenna 20 is provided, it is possible to establish the communication between the IC reader 1 and the non-contact type IC chip 32 on the optical disk 3 with certainty.

As a result, the optical disk 3 where the non-contact type IC chip 32 is provided can easily communicate with the non-contact type IC chip 32 of the optical disk 3 in any case where the optical disks 3 stored in the optical disk cases 2 are arranged, where the optical disk case 2 exists alone which stores the optical disk 3, and the optical disk 3 exists alone which is not stored in the optical disk case 2, and it is possible to easily recognize the information recorded on the non-contact type IC chip 32 such as the recording content of the optical disk 3.

Furthermore, in a case where the second antenna is used to obtain the information from the non-contact type IC chip 32, it is possible to perform the search for the information corresponding to the search condition from the non-contact type IC chip 32. With this configuration, for example, even in a case where a large number of the optical disk cases 2 are arranged, it is possible to easily find out the optical disk case 2 which stores the optical disk 3 storing the desired data as in the same state.

Second Embodiment

Next, a second embodiment of the present invention will be described. When recording contents of the non-contact type IC chips 32 of the optical disks 3 stored in the plurality of optical disk cases 2 arranged sideways are searched for by the IC reader, in a case where a movement speed is too fast, a reading error may be generated, or a reading skip of the non-contact type IC chip 32 may be generated. For this reason, an IC reader 7 according to the second embodiment detects the movement speed during the search by using a movement speed detection part 78 adapted to detect the movement speed of the IC reader 7 itself. Then, the IC reader 7 according to the present embodiment is different from the IC reader according to the first embodiment in that the user is notified that the speed is appropriate when the detected movement speed is within a predetermined range, and in a case where the detected movement speed is out of the predetermined range when, for example, the detected movement speed is too fast, the user is notified that the movement speed is abnormal. It should be noted that other components are allocated with the same reference numerals, and descriptions thereof will be omitted.

Figure 26:
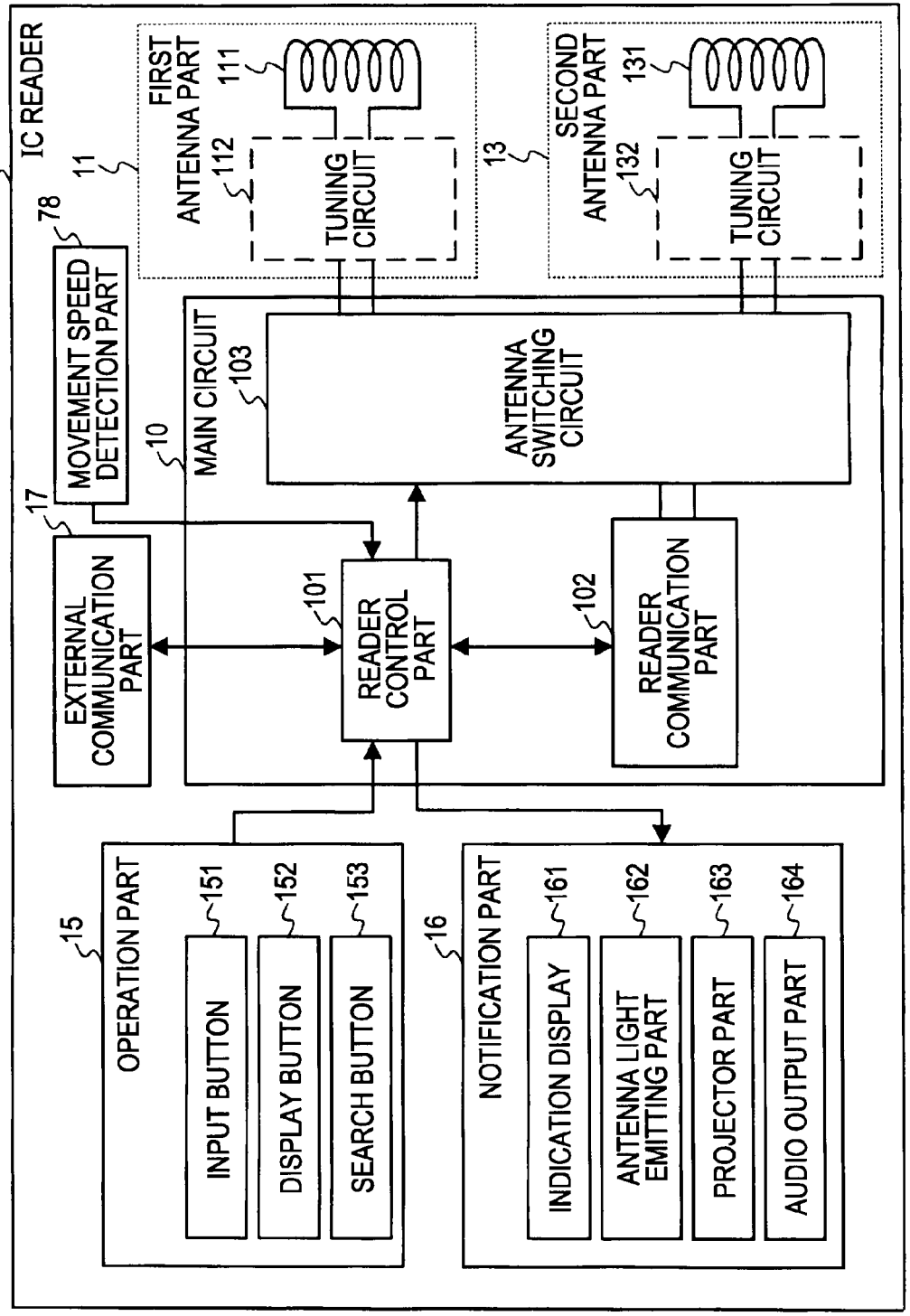
FIG. 26 illustrates a circuit configuration of an IC reader according to a second embodiment of the present invention.

FIG. 26 illustrates a circuit configuration of the IC reader according to the second embodiment.

The IC reader 7 according to the present embodiment is provided, similarly to the first embodiment, with the main circuit 10, the first antenna part 11, the second antenna part 13, the operation part 15, the notification part 16, and the external communication part 17. Also, the IC reader 7 according to the present embodiment is further provided with the movement speed detection part 78 in addition to the above. It should be noted that the outer shape of the IC reader 7, the arrangement of the antenna coils, and the like are similar to those according to the first embodiment.

The main circuit 10 is provided, similarly to the first embodiment, with the reader control part 101, the reader communication part 102, and the antenna switching circuit 103.

Similarly to the first embodiment, the reader control part 101 is a control part adapted to control the entire IC reader 7 in an overall manner. The reader communication part 102 is an RF circuit for performing a non-contact communication with the non-contact type IC chip 32 provided on the optical disk 3. The antenna switching circuit 103 is connected to the first antenna part 11 and the second antenna part 13 for communicating with the non-contact type IC chip provided to the optical disk.

Similarly to the first embodiment, the operation part 15 is provided with various input switches such as the input buttons 151, the display button 152, and the search button 153, and outputs the control signal in accordance with the operation input by the user to the reader control part 101. The notification part 16 is provided with the indication display 161, the antenna light emitting part 162, the projector parts 163, and the audio output part 164, and is adapted to notify the user of the state of the IC reader 7 in accordance with the instruction from the reader control part 101. The external communication part 17 sends and receives the data by performing the communication with the external information apparatus while following the instruction from the reader control part 101.

The movement speed detection part 78 is adapted to detect the movement speed of the IC reader 7. The movement speed detection part 78 is provided with an acceleration sensor, and can detect the movement speed in the thickness direction of the IC reader 7, that is, the movement speed in the short axis direction of the second antenna coil 131 (one-dimensional direction). On the basis of the movement speed detected by the movement speed detection part 78, the reader control part 101 determines whether or not the movement speed of the IC reader 7 while the reading operation performs the second antenna part 13 is faster than a predetermined speed. Then, in a case where this movement speed is equal to or lower than the predetermined speed, the search is executed, and on the basis of the instruction from the reader control part 101, a speed appropriate message indicating that the speed is appropriate and a detection message indicating that the search is normally executed are notified by the notification part 16. On the other hand, in a case where this movement speed is higher than the predetermined speed, on the basis of the instruction from the reader control part 101, through an output of a speed abnormal message, the user is notified of the abnormality by the notification part 16.

It should be noted that the movement speed detection part 78 of the IC reader 7 according to the present embodiment detects the movement speed in the one-dimensional direction, but the present invention is not limited to this. The movement in a two-dimensional direction (for example, the thickness direction of the IC reader 7 and furthermore the width direction of the IC reader 7) may be detected and furthermore a movement in a three-dimensional direction (that is, all directions) may also be detected.

Next, an operation of the IC reader according to the second embodiment will be described.

First, according to the second embodiment, the search communication processing executed in step S15 in the main processing will be described. In the search communication processing according to the present embodiment, a difference resides from the first embodiment that at the time of the execution of the present processing, a movement speed detection processing for detecting the movement speed of the IC reader 7 is executed.

Figure 27:
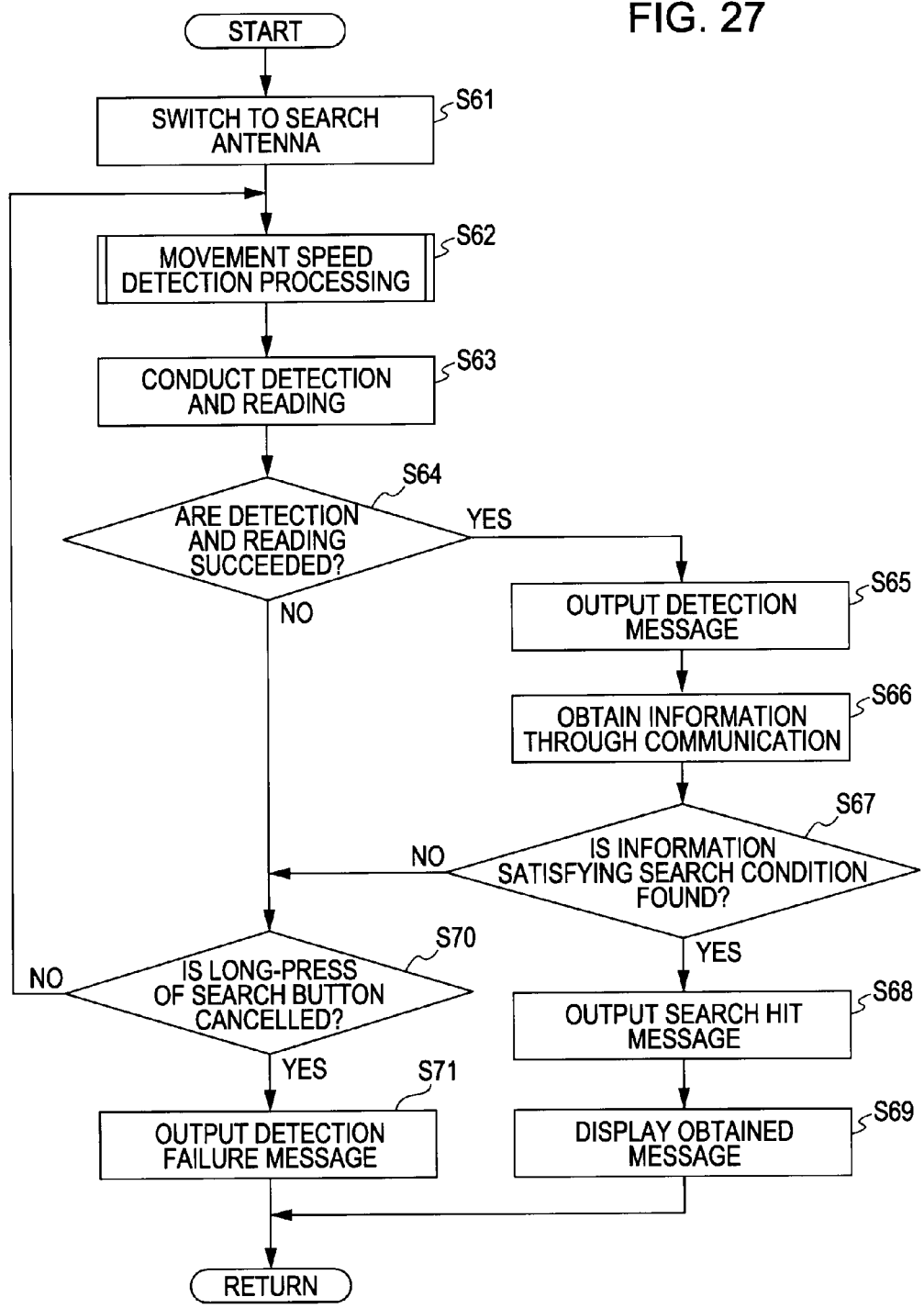
FIG. 27 is a flowchart for describing a search communication processing executed by the IC reader according to the second embodiment.

FIG. 27 is a flowchart for describing the search communication processing executed by the IC reader according to the second embodiment.

According to the second embodiment too, similarly to the first embodiment, in the main processing, when the long-press operation of the search button 153 performed by the user is detected, the reader control part 101 executes the search communication processing illustrated in FIG. 27.

First, the reader control part 101 sends to the antenna switching circuit 103, an instruction for switching the connection destination to the second antenna part 13 (step S61) and executes the movement speed detection processing (step S62). This movement speed detection processing is a processing of detecting the movement speed of the IC reader 7 by using the movement speed detection part 78 and determining whether or not the detected movement speed is normal, which will be described in detain with reference to FIG. 28.

Next, through the connected second antenna part 13, the reader control part 101 conducts the detection of the non-contact type IC chip 32 of the optical disk 3 and the reading of the recorded information are conducted (step S63). Then, the reader control part 101 determines whether or not the detection of the non-contact type IC chip 32 and the reading are succeeded (step S64). In a case where the detection and the reading are failed, the flow is advanced to the processing in step S70. On the other hand, in a case where the detection and the reading are succeeded, the flow is advanced to the processing in step S65.

In a case where the detection of the non-contact type IC chip 32 and the reading are failed, the reader control part 101 advances the flow to the processing in step S70. On the other hand, in a case where the detection and the reading are succeeded, the reader control part 101 allows the notification part 16 to output a detection message indicating that the detection of the non-contact type IC chip 32 and the reading of the recorded information are succeeded (step S65), and obtains appropriate information recorded on the non-contact type IC chip 32 through the communication with the non-contact type IC chip 32 (step S66).

Next, the reader control part 101 determines whether or not the search for the thus obtained information on the basis of the search condition obtained through the search condition obtaining processing in FIG. 13 and the information corresponding to the search condition is found (step S67). In a case where the information corresponding to the search condition is not found, the reader control part 101 advances to the processing in step S70. On the other hand, in a case where the information corresponding to the search condition is found, the reader control part 101 allows the notification part 16 to output the search hit message indicating that the information corresponding to the search condition is recorded on the non-contact type IC chip 32 (step S68), displays the thus obtained information on the indication display 161 provided to the notification part 16 (step S69), and thereafter, returns to the main processing.

In a case where the detection of the non-contact type IC chip 32 or the reading is failed in step S64 or in a case where the information corresponding to the search condition is not found from the non-contact type IC chip 32 in step S67, the reader control part 101 determines whether or not the long-press of the search button 153 performed by the user is cancelled (step S70). In a case where the long-press is not cancelled, the flow is advanced to the processing in step S62 (with this configuration, while the user presses the search button 153 for a long period of time, the processing from step S62 to step S67 is repeated). On the other hand, in a case where the long-press is cancelled, the reader control part 101 allows the notification part 16 to output the detection failure message indicating that the detection of the non-contact type IC chip or the reading of the recorded information is failed (step S71), and thereafter, returns to the main processing.

Herein, as the detection message, the detection failure message, and the search hit message, similarly to the detection message in step S24 in the display communication processing (FIG. 11) according to the first embodiment or the like, for example, the audio output part 164 may be allowed to output a predetermined electronic sound or a message based on a synthesized sound. Also, through a predetermined light emitting pattern of the antenna light emitting part 162 or the projector parts 163, the user may be notified of the detection of the non-contact type IC chip and the success or failure of the reading or the finding of the information corresponding to the search condition.

Next, the movement speed detection processing executed in step S62 in the search communication processing according to the second embodiment will be described.

Figure 28:
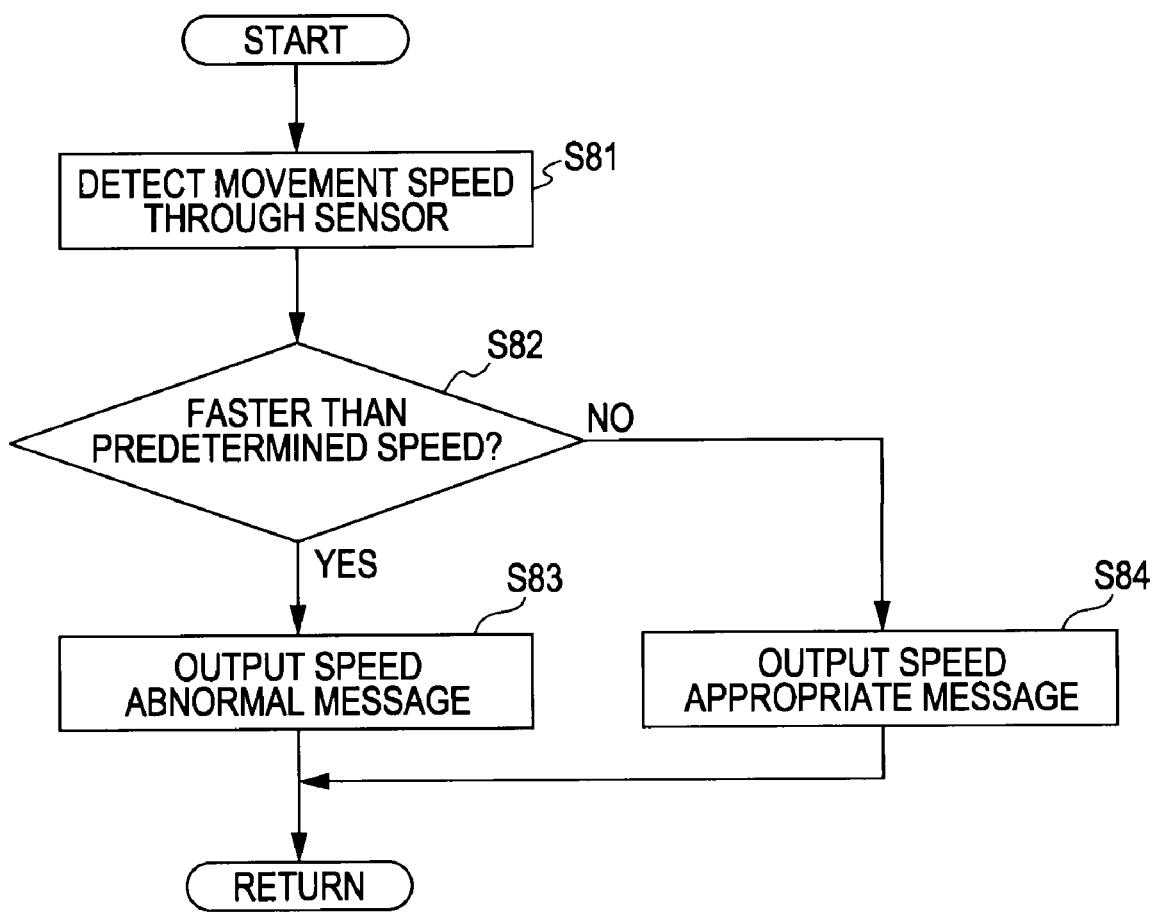
FIG. 28 is a flowchart for describing a movement speed detection processing executed by the IC reader according to the second embodiment.

FIG. 28 is a flowchart for describing the movement speed detection processing executed by the IC reader according to the second embodiment.

During the execution of the search communication processing illustrated in FIG. 27 according to the second embodiment, in step S62, the movement speed detection processing illustrated in FIG. 28 is executed by the reader control part 101.

First, the reader control part 101 detects the movement speed of the IC reader 7 by using the acceleration sensor of the movement speed detection part 78 (step S81).

Next, the reader control part 101 determines whether or not the movement speed of the IC reader detected in step S81 is higher than a predetermined speed (step S82). In a case where the movement speed of the IC reader 7 is higher than the predetermined speed, the reader control part 101 allows the notification part 16 to output a speed abnormal message indicating that the movement speed of the IC reader 7 is abnormal (step S83), and thereafter, returns to the search communication processing. On the other hand, in a case where the movement speed of the IC reader 7 is equal to or lower than the predetermined speed, the reader control part 101 allows the notification part 16 to output the speed appropriate message indicating that the movement speed of the IC reader 7 is appropriate (step S84), thereafter, returns to the search communication processing.

Next, a state of the detection for the movement speed at the time of the search for the information stored on the non-contact type IC chip by the IC reader according to the second embodiment will be described. Herein, a state in which the IC reader 7 according to the present embodiment is used in combination of the optical disk 3 and the optical disk case 2 described above to search for the information recorded on the non-contact type IC chip 32 will be described.

Figure 29:
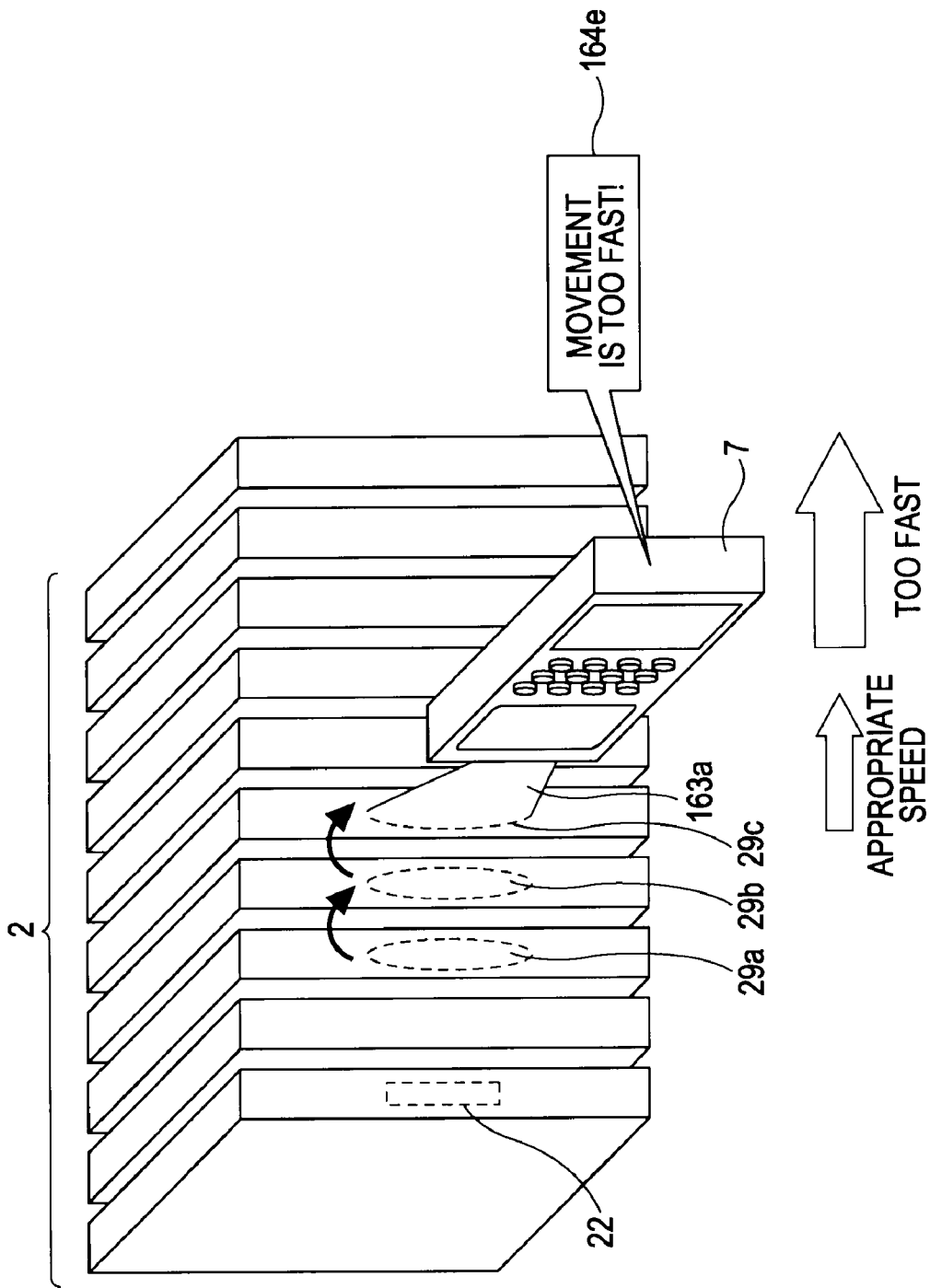
FIG. 29 illustrates a state in which the IC reader according to the second embodiment detects the movement speed.

FIG. 29 illustrates a state upon the detection for the movement speed by the IC reader according to the second embodiment.

As illustrated in FIG. 29, in a case where a large number of the optical disk cases 2 which store the optical disk 3 to which the non-contact type IC chips 32 is mounted and on which the booster antenna is mounted are arranged lengthwise in a standing manner, while moving the IC reader 7 according to the second embodiment to sequentially face the case side face where the antenna coil 22 of the booster antenna 20 is provided, it is possible to sequentially read the information recorded on the non-contact type IC chips 32. With this configuration, it is possible to search for the information from the non-contact type IC chips 32 mounted on the respective optical disks 3.

That is, similarly to FIG. 14, the optical disk cases 2 are respectively provided with the above-mentioned booster antenna units and the antenna coils 22 on the IC reader side of the booster antenna unit on the side face of the optical disk case 2 (the front side of FIG. 29).

Similarly to the first embodiment, while the user presses the search button 153 of the IC reader 7 for a long period of time, by sequentially exposing the second antenna part 13 provided on the front face to the respective antenna coils 22 of the optical disk case 2 (from the left to the right in the example of FIG. 29), it is possible to read the information recorded on the non-contact type IC chips 32 mounted to the respective optical disks 3. At this time, by the movement speed detection part 78 of the IC reader 7 according to the present embodiment, the movement speed of the IC reader 7 is detected. Then, in a case where the detected movement speed is higher than a predetermined speed (for example, 20 mm/s), the notification part 16 of the IC reader 7 outputs the speed abnormal message for notifying that the movement speed is abnormal. On the other hand, the detected movement speed is equal to or lower than the predetermined speed, the notification part 16 of the IC reader 7 outputs the speed appropriate message for notifying that the movement speed is appropriate. Also, when the detection of the non-contact type IC chip 32 in the search communication processing (FIG. 27) is normally performed, the non-contact type IC chip 32 of the optical disk 3 is detected from the notification part 16 of the IC reader 7, and the detection message for notifying that the communication is succeeded is output.

To be more specific, the speed abnormal message, the speed appropriate message, and the detection message are indicated by way of the irradiation light 163*a* irradiated from the projector parts 163 of the IC reader 7, the audio message 164*e* output from the audio output part 164, a character message displayed on the indication display 161, and the like.

Then, at the time of the execution of the search communication processing in FIG. 29, the IC reader 7 which has succeeded the detection and the communication of the non-contact type IC chip 32 searches for the information stored in the non-contact type IC chip 32.

Herein, the predetermined speed which becomes the reference as to whether or not the movement speed of the IC reader 7 is too fast is decided on the basis of a one-time communication sequence time in the communication between the IC reader 7 and the non-contact type IC chip 32, a polling time, and a distance by which the communication can be performed by using the antennas.

For example, in a case where the second antenna coil 131 of the second antenna part 13 is configured have outer diameters in the short axis direction and the long axis direction set different from each other, while moving the IC reader 7 in the short axis direction, when the non-contact type IC chip 32 is detected, the communication performable distance in the short axis direction is shortened. Therefore, in a case where the polling time is constant, in accordance with the narrowness of the outer diameter of the second antenna part 13, it is necessary to limit the movement speed in the direction. To be more specific, when a communication performable displacement distance in the short axis direction of the second antenna coil 131 of the second antenna part 13 is set as ±2 mm (that is, 4 mm in the communication performable range while the center of the second antenna coil 131 is set as the reference) and a polling time interval in the communication between the IC reader 7 and the non-contact type IC chip 32 is set as 0.2 second, while the movement by 4 mm which is the communication performable range is performed, it is necessary to perform the polling at least once. Thus, if the movement at a speed lower than 4/0.2=[20 mm/s] is not performed, the communication may be failed in some cases.

It should be noted that in a case where the movement speed is too fast, the reading skip of the arranged optical disk case 2 may also be generated in some cases, and therefore in addition to the output of the audio message "movement is too fast!", an audio message "read again for previous 2 to 3 disks" may also be output. Also, furthermore, as to whether or not the reading is performed again by moving back by xx disks, by calculating the number of disks equivalent to the movement distance from the movement distance beyond the predetermined speed (an integral value of the movement speed), and the number of the disks may be output as the audio message. Of course, the movement distance may be output by way of a distance value "move back by xx mm" as the audio message.

With the IC reader 7 according to the second embodiment described above, by outputting the particular light emitting pattern of the irradiation light 163a (for example, in a case where the movement speed of the IC reader 7 is too fast, the irradiation light 163a is output through blinking), the audio message based on the synthesized sound (for example, in a case where the movement speed of the IC reader 7 is too fast, the audio message 164e "movement is too fast!") or the like as the speed abnormal message, it is possible to notify the user that the movement speed of the IC reader 7 is abnormal.

Also, in a case where the movement speed is appropriate such as a case where the movement speed of the IC reader 7 is equal to or lower than the predetermined speed, by outputting the speed appropriate message based on the particular light emitting pattern of the irradiation light 163a which is different from the speed abnormal message, the audio message based on the synthesized sound indicating that the speed is appropriate, or the like, it is possible to notify the user that the movement speed of the IC reader 7 is appropriate.

As the result from the above, in a case where the information recorded on the non-contact type IC chips 32 of the large number of optical disks 3 stored in the optical disk cases 2 is searched for while the user moves the IC reader 7, by notifying the user as to whether or not the movement speed of the IC reader 7 is appropriate, it is possible to easily move the IC reader 7 at the appropriate movement speed of the user at the time of the search, and therefore it is possible to prevent missing of the detection of the non-contact type IC chip 32 due to the detection error or the reading skip.

Third Embodiment

Next, a third embodiment of the present invention will be described. The information stored in the non-contact type IC chip 32 detected by the IC reader, for example, may be transferred to a personal computer to manage the recording content of the optical disk, and the information which identifies a content of interest such as a title of music, an artist name, and the like may be utilized to be sent to an acquaintance via an electronic mail or the like. Herein, if the thus obtained information is directly utilized for other purposes, a significant convenience is realized. For this reason, the IC reader 1 according to the third embodiment is different from the IC reader according to the first embodiment in that the external communication part 17 can transfer the information stored in the non-contact type IC chip 32 detected by the IC reader 1, for example, to an external information terminal apparatus such as a mobile phone. It should be noted that the IC reader 1 and other similar components are allocated with the same reference numerals, and descriptions thereof will be omitted.

Next, a description will be given of an operation of the IC reader according to the third embodiment.

First, a main processing according to the third embodiment will be described. The main processing according to the present embodiment is different from the main processing the first embodiment in that in a case where an information transfer menu is selected through the operation of the operation part 15 performed by the user at the time of the execution of the present processing, the information obtained from the non-contact type IC chip 32 of the optical disk 3 is transferred to the external information terminal apparatus via the external communication part 17.

Figure 30:
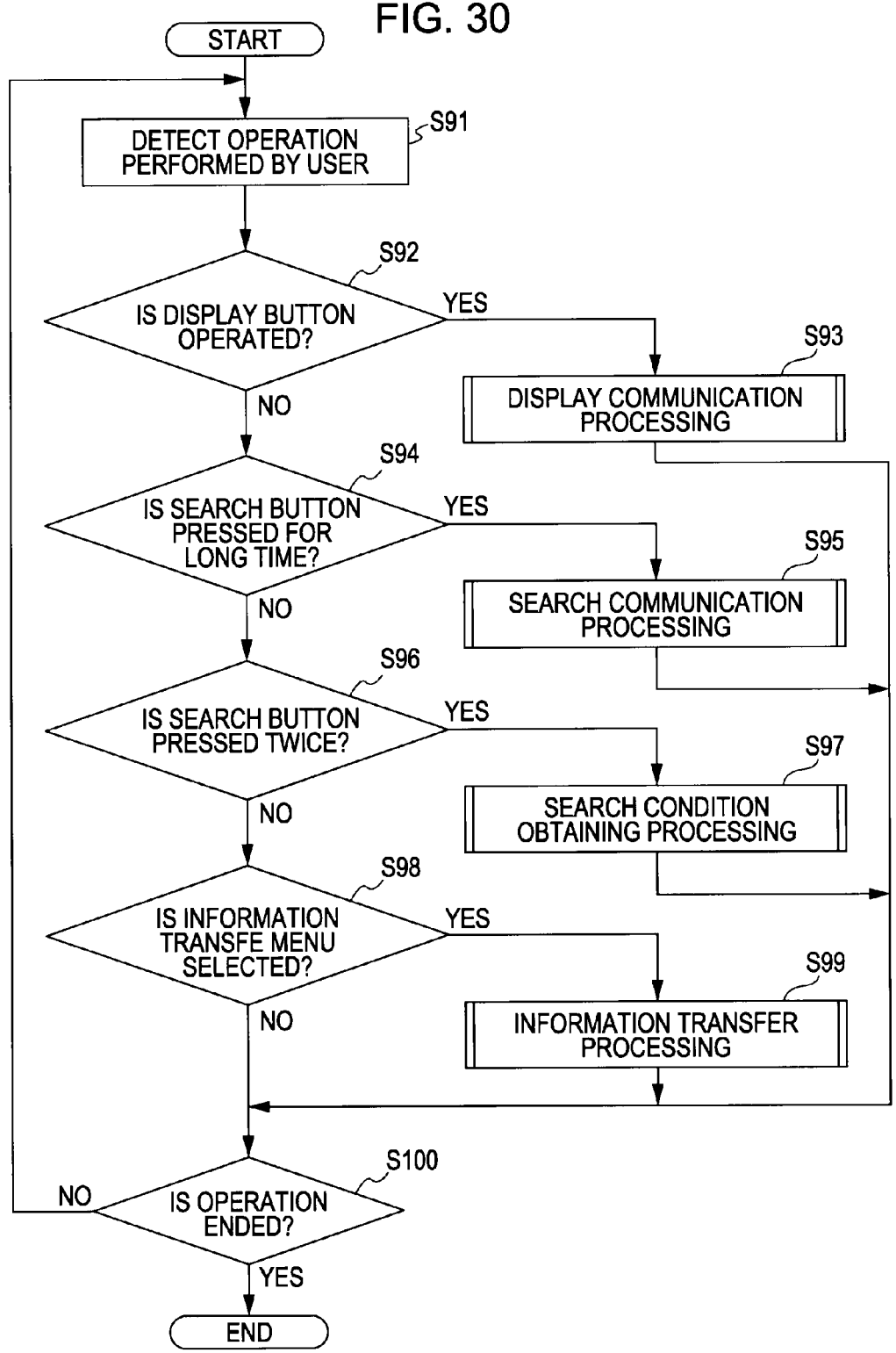
FIG. 30 is a flowchart for describing a main processing executed by the IC reader according to a third embodiment of the present invention.

FIG. 30 is a flowchart for describing the main processing executed by the IC reader according to the third embodiment.

First, when the operation part 15 is operated by the user, the reader control part 101 of the IC reader 1 detects the operation of the display button 152 performed by the user (step S91).

Next, the reader control part 101 determines whether or not the operation of the display button 152 performed by the user in step 91 (step S92). In a case where the operation of the display button 152 is not detected, the flow is advanced to the processing in step S94. On the other hand, in a case where the operation of the display button 152 is detected, the display communication processing is executed (step S93), and thereafter, the flow is advanced to the processing in step S100.

Next, the reader control part 101 detects whether or not the long-press operation of the search button 153 performed by the user in step S91 is detected (for example, an operation for keeping the press of the search button 153 for 1 second or longer) (step S94). In a case where the long-press operation of the search button 153 is not detected, the flow is advanced to the processing in step S96. On the other hand, in a case where the long-press operation of the search button 153 is detected, the search communication processing is executed (step S95), and thereafter, the flow is advanced to the processing in step S100.

Next, the reader control part 101 determines whether or not the double-press operation of the search button 153 performed by the user is detected in step S91 (for example, an operation of pressing the search button 153 at least twice in 1 second) (step S96). In a case where the double-press operation of the search button 153 is not detected, the flow is advanced to the processing in step S100. On the other hand, in a case where the double-press operation of the search button 153 is detected, the search condition obtaining processing is executed (step S97), and thereafter, the flow is advanced to the processing in step S100.

Next, the reader control part 101 determines whether or not the selection of the information transfer menu (omitted from the drawing) through the operation of the input buttons 151 of the operation part 15 performed by the user is accepted in step S91 (step S98). In a case where the selection of the information transfer menu through the input buttons 151 is not accepted, the flow is advanced to the processing in step S100. On the other hand, in a case where the selection of the information transfer menu through the input buttons 151 is accepted, an information transfer processing is executed (step S99), and thereafter, the flow is advanced to the processing in step S100. This information transfer processing is a processing of sending the information obtained from the non-contact type IC chip 32 of the optical disk 3 to an external information terminal apparatus via the external communication part 17, which will be described in detail with reference to FIG. 31.

Then, the reader control part 101 repeats the above-mentioned processing in a case where the operation performed by the user is detected (step S100), and in a case where the detection of the operation performed by the user is ended, the reader control part 101 ends the processing.

Next, the information transfer processing executed in step S99 in the main processing according to the third embodiment will be described.

FIG. 31 is a flowchart for describing the information transfer processing executed by the IC reader according to the third embodiment.

In the main processing according to the third embodiment, when the selection of the information transfer menu through the operation of the input buttons 151 performed by the user is accepted, the reader control part 101 executes the information transfer processing illustrated in FIG. 31.

First, the reader control part 101 accepts the specification of the information to be transferred through the operation of the input buttons 151 performed by the user (step S101). The user can specify the disk main information and the disk auxiliary information illustrated in FIGS. 16 to 19 previously obtained from the non-contact type IC chip 32 in the information transfer menu (not shown).

Next, the reader control part 101 accepts the specification of the transfer method through the operation of the input buttons 151 performed by the user (step S102). The user can specify the previously decided transfer method in the information transfer menu (not shown) such as the display to the indication display 161 of the QR code or the infrared communication based on IrDA.

Next, the reader control part 101 determines whether or not the transfer method specified through the operation of the input buttons 151 performed by the user is the QR code in step S102 (step S103).

In a case where the specified transfer method is the QR code, the reader control part 101 generates the QR code from the information to be transferred which is specified in step S101 (step S104), and the displays thus generated QR code on the indication display 161 (step S105). Then, the reader control part 101 accepts an input of a transfer completion confirmation indicating that the user confirmed the transfer completion (step S106), and thereafter, returns to the main processing.

On the other hand, in a case where the specified transfer method is not the QR code, the reader control part 101 determines whether or not the transfer method specified through the operation of the input buttons 151 performed by the user is IrDA in step S102 (step S107).

In a case where the specified transfer method is IrDA, the reader control part 101 outputs a reception preparation message to the notification part 16 for urging the user for a reception preparation of the information terminal apparatus at the sending destination (step S108) and accepts an input of a transfer start instruction by the user which is an instruction of the start of the information transfer (step S109). Then, the reader control part 101 sends the information to be transferred which is specified in step S101 on the basis of IrDA (step S110), accepts an input of a transfer completion confirmation indicating the user confirms the transfer completion (step S111), and thereafter, returns to the main processing.

On the other hand, in a case where the specified transfer method is not IrDA, the reader control part 101 outputs a transfer abort message indicating that the information transfer is aborted to the notification part 16 (step S112), and thereafter, returns to the main processing.

To be more specific, the reception preparation message and the transfer abort message is indicated by way of the irradiation light 163a irradiated from the projector parts 163 of the IC reader 7, the audio message output from the audio output part 164, a character message displayed on the indication display 161, and the like.

With the IC reader 1 according to the third embodiment described above, it is possible to send the information obtained from the non-contact type IC chip 32 of the optical disk 3 to the other information terminal apparatus on the basis of the QR code or the IrDA communication. As a result, the information which is obtained through the search and is recorded on the non-contact type IC chip 32 such as the recording content of the optical disk 3 can be directly utilized, and the usability for the user is increased. At the same time, the promotion of the utilization of the music data and the video data can be realized through the mutual utilization between the IC reader and the other information terminal apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A portable information reading apparatus adapted to read information recorded on a non-contact type IC chip, the information reading apparatus comprising:
    a first antenna which has a loop-like or spiral-like shape and is provided in a plate-like manner on one surface of an outer shape;
    a second antenna which is provided in a plate-like manner on a side face with respect to the one surface, has a loop-like or spiral-like shape, and has a size in a short axis of the second antenna which is smaller than a size in a short axis of the first antenna; and
    a control part adapted to communicate with the non-contact type IC chip by selectively using one of the first antenna and the second antenna to obtain the information recorded on the non-contact type IC chip,
    wherein in a case where the information is obtained from the non-contact type IC chip via the second antenna, the control part determines whether or not the information obtained via the second antenna corresponds to a search condition used for searching for the information recorded on the non-contact type IC chip.

2. The information reading apparatus according to claim 1, further comprising:
    a first input part; and
    a second input part,
    wherein when an operation of the first input part performed by a user is accepted, the control part obtains the information recorded on the non-contact type IC chip via the first antenna, and when an operation of the second input part performed by the user is accepted, the control part obtains the information from the non-contact type IC chip via the second antenna and determines whether or not the information obtained via the second antenna corresponds to the search condition.

3. The information reading apparatus according to claim 2, wherein
the first input part is provided in the vicinity of the first antenna, and
the second input part is provided in the vicinity of the second antenna.

4. The information reading apparatus according to claim 1, wherein a normal line on a formation surface of the first antenna is orthogonal to a normal line of a loop surface of the second antenna.

5. The information reading apparatus according to claim 4, wherein
the normal line on the formation surface of the first antenna directs in a vertical direction when the user grasps the information reading apparatus, and
a normal line on a formation surface of the second antenna directs forward as viewed from the user when the user grasps the information reading apparatus.

6. The information reading apparatus according to claim 1, wherein
the first antenna is configured to be able to communicate with the non-contact type IC chip provided to the optical disk through an electromagnetic coupling with an antenna coil formed along a circumferential direction on an optical disk substrate of the optical disk,
the second antenna is configured to enable an electromagnetic coupling with an antenna coil on a side face side which is provided in contact with or in proximity to a side face perpendicular to a recording surface of the optical disk within the optical disk case among two antenna coils of a booster antenna provided to the optical disk case for storing the optical disk,
the booster antenna is configured by connecting the antenna coil on the side face side, the antennal coil provided to the optical disk within the optical disk case, and the antenna coil on a disk side for establishing the electromagnetic coupling to relay signals sent and received among the antenna coils, and
when the second antenna is arranged in proximity to the antenna coil on the side face side on the optical disk case, the control part can obtain the information via the booster antenna from the non-contact type IC chip provided on the optical disk within the optical disk case.

7. The information reading apparatus according to claim 1, further comprising:
a search condition input part adapted to accept an input of the search condition,
wherein in a case where the information is obtained from the non-contact type IC chip via the second antenna, the control part determines whether or not the information obtained via the second antenna corresponds to the search condition accepted by the search condition input part.

8. The information reading apparatus according to claim 1, further comprising:
a notification part adapted to notify a user of a state of the information reading apparatus,
wherein in a case where the information is obtained from the non-contact type IC chip via the second antenna, the control part determines whether or not the information obtained via the second antenna corresponds to the search condition, and in a case where it is determined that the information obtained via the second antenna corresponds to the search condition, the notification part is allowed to notify that the information corresponding to the search condition is recorded on the non-contact type IC chip.

9. The information reading apparatus according to claim 8, wherein
the notification part can output an audio message, and
the control part outputs an audio message to allow the notification part to notify that the information corresponding to the search condition is recorded on the non-contact type IC chip in a case where it is determined that the information obtained via the second antenna corresponds to the search condition.

10. The information reading apparatus according to claim 1, further comprising:
a speed detection part adapted to detect a movement speed of the information reading apparatus; and
a notification part adapted to notify a user of a state of the information reading apparatus,
wherein the control part determines whether or not the detected movement speed is faster a predetermined speed by using the speed detection part during a reading operation based on the second antenna, and in a case where the detected movement speed is faster the predetermined speed, the notification part notifies the user of an abnormality.

11. The information reading apparatus according to claim 10, wherein the speed detection part detects the movement speed of the information reading apparatus in a direction parallel to a formation surface of the second antenna.

12. The information reading apparatus according to claim 10, wherein the speed detection part detects the movement speed of the information reading apparatus in a direction of the short axis of the second antenna.

13. The information reading apparatus according to claim 1, further comprising:
a notification part adapted to notify a user of a state of the information reading apparatus, wherein
the notification part has a display screen on which information is displayed, and
the control part displays at least one of information recorded on the non-contact type IC chip obtained by the first antenna and other information associated with the information on the display screen of the notification part.

14. The information reading apparatus according to claim 1, further comprising:
a notification part adapted to notify a user of a state of the information reading apparatus, wherein
the notification part includes a light emitting part adapted to emit light, and
the control part allows the light emitting part of the notification part to emit the light when the communication with the non-contact type IC chip is performed via at least one of the first antenna and the second antenna.

15. The information reading apparatus according to claim 1, further comprising:
a notification part adapted to notify a user of a state of the information reading apparatus, wherein
the notification part includes a light emitting part adapted to emit light to a front of the second antenna, and
the control part allows the light emitting part of the notification part to emit the light in a case where it is determined that the information obtained via the second antenna corresponds to the search condition.

16. The information reading apparatus according to claim 15, wherein the light emitting part emits ultraviolet rays.

17. The information reading apparatus according to claim 1, further comprising:
an external communication part which is capable of communicating with another information apparatus,
wherein the control part can receive the search condition from the other information apparatus via the external communication part.

18. The information reading apparatus according to claim 1, further comprising:
an external communication part which is capable of communicating with another information apparatus,
wherein the control part can send a search result of the non-contact type IC chip based on the search condition to the other information apparatus via the external communication part.

19. An information reading method of reading information recorded on a non-contact type IC chip by using a portable information reading apparatus including a control part, the information reading method comprising the steps of:
allowing the control part to select one of a loop-like or spiral-like shape first antenna and a second antenna which has a loop-like or spiral-like shape and has a smaller size in a short axis than a size in a short axis of the first antenna to communicate with the non-contact type IC chip via the selected antenna to obtain the information recorded on the non-contact type IC chip; and
allowing the control part to determine, in a case where the information is obtained from the non-contact type IC chip via the second antenna, whether or not the information obtained via the second antenna corresponds to a search condition used for searching for the information recorded on the non-contact type IC chip.

* * * * *